United States Patent
Baek

(10) Patent No.: US 10,387,984 B2
(45) Date of Patent: Aug. 20, 2019

(54) METHOD OF PROVIDING CALL TAXI SERVICE AND CALL TAXI SERVICE SERVER

(71) Applicant: NAVER CORPORATION, Seongnam-si (KR)

(72) Inventor: Jong Eun Baek, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 570 days.

(21) Appl. No.: 15/069,202

(22) Filed: Mar. 14, 2016

(65) Prior Publication Data

US 2016/0267618 A1    Sep. 15, 2016

(30) Foreign Application Priority Data

Mar. 12, 2015  (KR) .......................... 10-2015-0034643

(51) Int. Cl.
| | | |
|---|---|---|
| *G06Q 50/32* | (2012.01) | |
| *G06Q 10/06* | (2012.01) | |
| *H04W 4/04* | (2009.01) | |

(52) U.S. Cl.
CPC ..... *G06Q 50/32* (2013.01); *G06Q 10/063118* (2013.01); *H04W 4/046* (2013.01)

(58) Field of Classification Search
CPC ......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 6,456,207 B1* | 9/2002 | Yen | ........................ | G08G 1/202 235/384 |
| 7,113,864 B2* | 9/2006 | Smith | .................. | G06Q 10/025 701/117 |
| 7,124,087 B1* | 10/2006 | Rodriguez | ............. | G06Q 10/02 705/5 |
| 7,263,437 B2* | 8/2007 | Hirose | .................. | G08G 1/202 340/902 |
| RE46,727 E * | 2/2018 | Pomerantz | | |
| 2004/0049424 A1* | 3/2004 | Murray | .................. | G06Q 10/04 705/14.14 |
| 2004/0093280 A1* | 5/2004 | Yamaguchi | ........ | G06Q 30/0601 705/26.1 |

(Continued)

FOREIGN PATENT DOCUMENTS

| | | |
|---|---|---|
| KR | 2002-0041721 | 6/2002 |
| KR | 20-2010-0115414 | 10/2010 |

(Continued)

OTHER PUBLICATIONS

Jacobson, Mark. "Night-Shifting for the Hip Fleet", New York Magazine. Sep. 22, 1975. (Year: 1975).*

(Continued)

*Primary Examiner* — Alan S Miller
(74) *Attorney, Agent, or Firm* — Greer Burns & Crain, Ltd.

(57) ABSTRACT

Provided are a method of providing a call taxi service and a call taxi service server providing the method, in which a call taxi service is provided by using human and physical network resources of a plurality of call taxi companies. Accordingly, human and physical networks for the call taxi service become abundant, and thus a dispatch success rate regarding a call taxi request is increased and a dispatch time is reduced.

19 Claims, 23 Drawing Sheets

(56) References Cited

U.S. PATENT DOCUMENTS

| | | | | |
|---|---|---|---|---|
| 2004/0236501 A1* | 11/2004 | Hirose | ................... | G08G 1/202 701/422 |
| 2005/0227620 A1* | 10/2005 | Morimoto | .............. | G06Q 10/08 455/41.2 |
| 2006/0034201 A1* | 2/2006 | Umeda | ................. | G06Q 30/02 370/310 |
| 2006/0065733 A1* | 3/2006 | Lee | ................... | G06F 17/30879 235/462.01 |
| 2011/0099040 A1* | 4/2011 | Felt | .................... | G06F 17/3087 705/7.12 |
| 2012/0041675 A1* | 2/2012 | Juliver | .................. | G06Q 10/08 701/465 |
| 2013/0132887 A1* | 5/2013 | Amin | ...................... | G06F 3/048 715/781 |
| 2013/0158846 A1* | 6/2013 | Zhang | .................... | G08G 1/123 701/117 |
| 2013/0304804 A1* | 11/2013 | Glasser | ............ | H04L 29/08522 709/203 |
| 2014/0026065 A1* | 1/2014 | Wang | ..................... | G06Q 50/30 715/744 |
| 2015/0046080 A1* | 2/2015 | Wesselius | ............. | G08G 1/202 701/428 |
| 2015/0304368 A1* | 10/2015 | Vaccari | ................. | G06F 1/3215 709/206 |
| 2016/0042303 A1* | 2/2016 | Medina | ................. | G06Q 10/02 705/5 |
| 2016/0267618 A1* | 9/2016 | Baek | ....................... | G06Q 50/32 |
| 2016/0292596 A1* | 10/2016 | Gaitan | ................ | G06Q 10/025 |
| 2017/0169366 A1* | 6/2017 | Klein | ................... | G06Q 10/025 |
| 2018/0075568 A1* | 3/2018 | Zhao | ................... | G06Q 30/0635 |

FOREIGN PATENT DOCUMENTS

| | | |
|---|---|---|
| KR | 10-2011-0026402 A | 3/2011 |
| KR | 10-2013-0137929 | 12/2013 |

OTHER PUBLICATIONS

Korean Office Action dated Dec. 17, 2015 in corresponding Korean App. No. 10-2015-0034643.

Korean Office Action dated Sep. 5, 2016 in corresponding Korean App. No. 10-2015-0034643.

* cited by examiner

METHOD OF PROVIDING CALL TAXI SERVICE AND CALL TAXI SERVICE SERVER

RELATED APPLICATION

This application claims the benefit of Korean Patent Application No. 10-2015-0034643, filed on Mar. 12, 2015, in the Korean Intellectual Property Office, the disclosure of which is incorporated herein in its entirety by reference.

BACKGROUND OF THE INVENTION

1. Field of the Invention

The present invention relates to a method of providing a call taxi service and a call taxi service server providing the method, and more particularly, to a method of providing a call taxi service, in which existing call taxi control servers are integrally linked such that a call taxi is requested and dispatched through human and physical networks built by the existing call taxi control servers.

2. Description of the Related Art

A call taxi service is used by a customer to request a call taxi company for a call taxi and to call a call taxi to a desired location, and according to development of information technology (IT) technologies, various methods of providing a call taxi service by using a mobile communication terminal carried by a user have been suggested.

Since general technologies suggested as methods of providing a call taxi service by using a mobile communication terminal are configured as a system in which a call taxi relay server is directly connected to a mobile communication terminal of a user and a taxi terminal, not only the user but also a taxi driver have to install a separate program or application providing a call taxi service.

Specifically, since such general technologies are operated independently without using a call taxi service network already built by a taxi company or a call taxi control company, the general technologies cannot use human and physical service networks built by the taxi company or the call taxi control company.

Also, since the credibility of a user requesting a call taxi without using the taxi company or the call taxi control company is not guaranteed, a taxi driver who responded to the request of the user is responsible for a loss of a dishonest call from the user who does not actually board a call taxi.

In addition, if the user does not know a path from a departure point to a destination, the user has to follow a driving route selected by the taxi driver, and thus if the taxi driver does not select an optimum path but makes a detour, the user may have to pay for unnecessary taxi fares.

Furthermore, if the user is a drunken person or is a female, an unsavory incident may occur after boarding the call taxi, and thus methods for preventing such unsavory incident or quickly responding to the unsavory incident need to be provided.

SUMMARY OF THE INVENTION

One or more embodiments of the present invention include a call taxi service using a mobile communication terminal, in which a call taxi relay server is configured as a system directly connected to a mobile communication terminal of a user and a taxi terminal, and thus not only the user but also a taxi driver do not have to separately install a program or an application providing a call taxi service.

One or more embodiments of the present invention include a call taxi service, in which human and physical service networks built by a taxi company or a call taxi control company may be used by using a call taxi service network already built by the taxi company or the call taxi control company.

One or more embodiments of the present invention include a call taxi service, in which credibility of a user directly requesting a call taxi from a taxi driver through a call taxi relay server without using a taxi company or a call taxi control company is guaranteed.

One or more embodiments of the present invention include a call taxi service, in which a user who does not know a path from a departure point to a destination and thus has to follow a driving route selected by a taxi driver is prevented from paying unnecessary taxi fares as the taxi driver maliciously takes a detour path.

One or more embodiments of the present invention include a call taxi service, in which an unsavory incident that may occur if a user is a drunken person or a female may be prevented or quickly managed.

According to one or more embodiments of the present invention, a method of providing a call taxi service includes: receiving, by a call taxi service server, a call taxi request from a mobile communication terminal of a user; requesting, by the call taxi service server, a call taxi control server to dispatch a call taxi, and generating, by the call taxi service server, distich information upon receiving a dispatch response from the call taxi control server; and providing, by the call taxi service server, the dispatch information to the mobile communication terminal.

Receiving of the call taxi request may include: providing, to the mobile communication terminal, a call taxi service screen including an input box for at least one of destination information and departure point information; and generating call request information including at least one of the destination information, the departure point information, and member information of the user, and requesting to dispatch a call taxi may include requesting the call taxi control server to dispatch a call taxi by transmitting the call request information to the call taxi control server.

Providing of the call taxi service screen may include providing the call taxi service screen according to a call taxi search of the user through an integrated search screen provided to the mobile communication terminal or according to selection of a call taxi request icon included in a map search screen provided to the mobile communication terminal.

The member information may include at least one of contact number information of the user and credibility information according to call taxi service using history of the user.

Receiving of the call taxi request may further include: calculating and providing, to the mobile communication terminal, at least one expected route based on the departure point information and the destination information; and generating driving route information based on an expected route selected by the user, and the method may further include, after the requesting to dispatch a call taxi, providing the driving route information to a terminal of a dispatched call taxi.

Providing of the driving route information may include transmitting the driving route information to the terminal of the dispatched call taxi through the call taxi control server.

A dispatch response may include connection information about the terminal of the dispatched call taxi, and providing of the driving route information may include transmitting the driving route information to the terminal of the dispatched call taxi through the connection information.

Generating of the driving route information may include: providing a route setting screen to the mobile communication terminal; and generating driving route information by modifying the expected route according to a route setting of the user.

The request to dispatch a call taxi may include: providing at least one piece of call taxi company information to the mobile communication terminal of the user; requesting a call taxi control server corresponding to call taxi company information selected by the user to dispatch a call taxi, and receiving a dispatch response from the call taxi control server; and generating dispatch information based on the dispatch response.

The request to dispatch a call taxi may include: requesting a plurality of call taxi control servers corresponding to a plurality of call taxi companies according to a set order of the plurality of call taxi companies to dispatch a call taxi, wherein, when a pre-set response time exceeds or a dispatch inability response is received, a call taxi control server corresponding to a next call taxi company is requested to dispatch a call taxi based on the set order; receiving a dispatch response from one of the call taxi control servers; and generating dispatch information based on the dispatch response.

The request to dispatch a call taxi may include: simultaneously requesting a plurality of call taxi control servers corresponding a plurality of call taxi companies to dispatch a call taxi; receiving a dispatch response from at least one of the plurality of call taxi control servers; and generating dispatch information based on the dispatch response received from the call taxi control server that transmitted the dispatch response first.

The request to dispatch a call taxi may include: receiving dispatchability information from at least one call taxi control server by inquiring of the at least one call taxi control server about dispatchability based on the call taxi request, and generating at least one piece of call taxi information based on the dispatchability information; providing the at least one piece of call taxi information to the mobile communication terminal of the user; requesting a call taxi control server corresponding to call taxi information selected by the user to dispatch a call taxi, and receiving a dispatch response from the call taxi control server; and generating dispatch information based on the dispatch response.

The call tax information may include at least one of taxi company information, taxi type information, license plate number information, driver information, and taxi location information.

Providing of the at least one piece of call taxi information may include providing call taxi information about at least one dispatchable call taxi to a map screen based on the taxi location information.

The dispatch response may include location information of a dispatched call taxi, and providing of the dispatch information may include providing the dispatch information to a map screen based on the location information of the dispatched call taxi.

The method may further include: receiving, from the mobile communication terminal of the user, a boarding confirmation regarding a dispatched call taxi; and generating and transmitting boarding information including the dispatch information to a contact number pre-set correspondingly to the user or to a contact number input by the user.

Generating and transmitting of the boarding information may include generating and transmitting uniform resource locator (URL) information about a storage location in which the boarding information is stored.

The method may further include: receiving location information from the mobile communication terminal of the user periodically or in real-time and generating moving route information based on the location information; and storing the moving route information in the storage location corresponding to the URL information.

The method may further include: receiving an alighting confirmation from the mobile communication terminal of the user; and accumulating call taxi service using history of the user and calculating the credibility of the user based on the call taxi service using history, and storing information about the credibility correspondingly to member information of the user.

According to one or more embodiments of the present invention, a call taxi service server is configured to request a call taxi control server to dispatch a call taxi according to a call taxi request from a mobile communication terminal of a user, and generate and provide, to the mobile communication terminal, dispatch information according to a dispatch response from the call taxi control server.

The call taxi service server may be further configured to interwork with a search service server providing an integral search service to the mobile communication terminal or with a map service server providing a map search service to the mobile communication terminal, to provide a call taxi service linked to the integral search service or the map search service.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present invention will be described in detail with reference to the accompanying drawings.

The terms used in the present specification are merely used to describe particular embodiments, and are not intended to limit the present invention. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Also, while describing the present invention, detailed descriptions about related well-known functions or configurations that may diminish the clarity of the points of the present invention are omitted.

The present invention provides a method of providing services of effectively requesting for and dispatching a call taxi by using human and physical networks built by a plurality of existing call taxi control servers by integrally linking the plurality of existing call taxi control servers.

Figure 1:
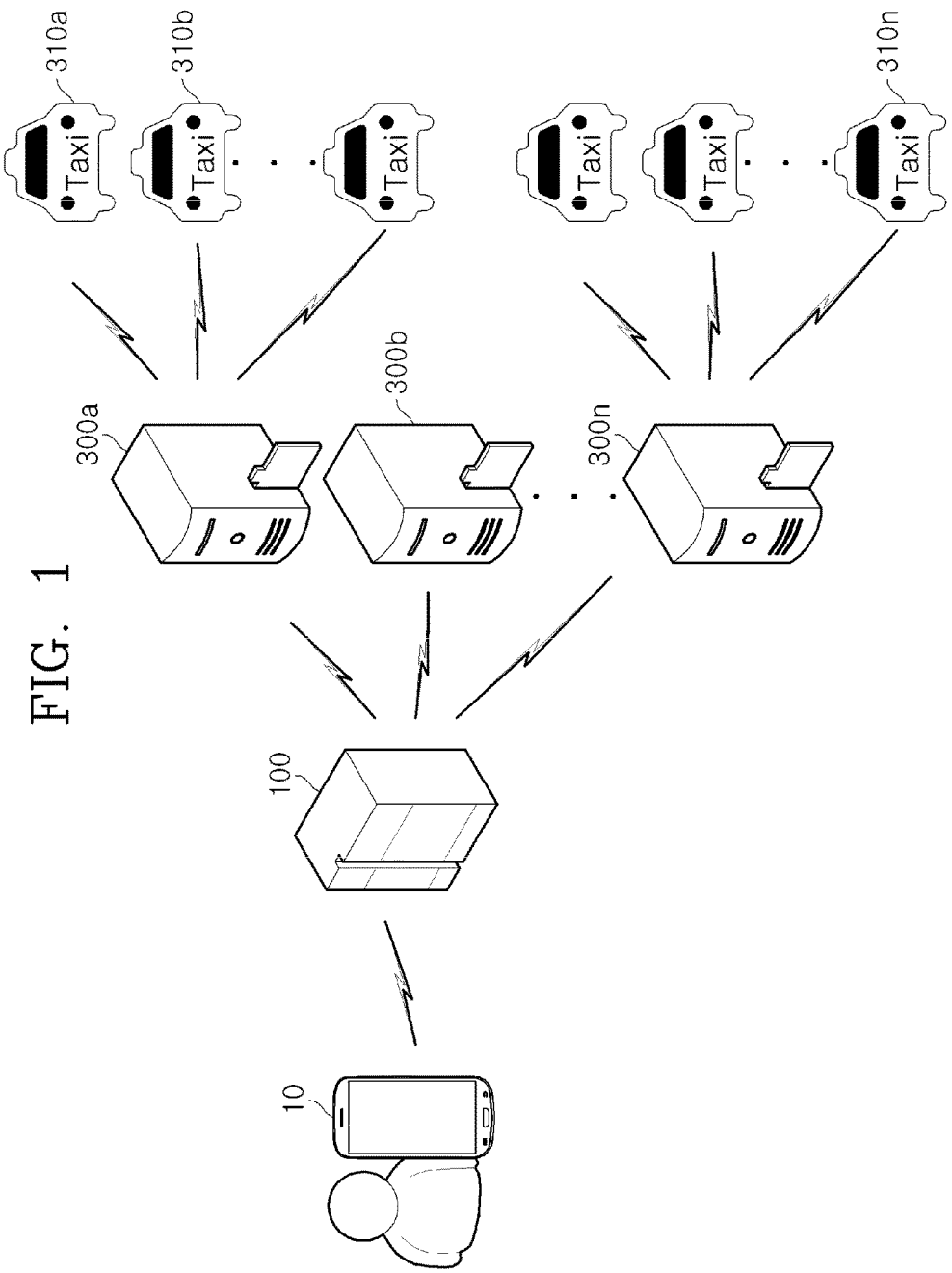
FIG. 1 is a schematic diagram of a call taxi service system according to an embodiment of the present invention.

FIG. 1 is a schematic diagram of a call taxi service system according to an embodiment of the present invention.

The call taxi service system according to an embodiment of the present invention includes a mobile communication terminal 10 of a user, a call taxi service server 100, call taxi control servers 300a through 300n, and call taxi terminals 310a through 310n.

The call taxi service server 100 provides a call taxi service to the mobile communication terminal 10 of the user, wherein upon receiving a call taxi request from the mobile communication terminal 10, the call taxi service server 10 requests the call taxi control servers 300a through 300n linked to the call taxi service server 100 for a call taxi and provides dispatch information about a dispatched call taxi to the mobile communication terminal 10.

Here, the mobile communication terminal 10 is a portable communication apparatus, and may be any one of various communication terminals, such as a smart phone, a personal digital assistant (PDA), a tablet personal computer (PC), and a laptop. The mobile communication terminal 10 may perform a call taxi service process by accessing a call taxi service webpage of the call taxi service server 100 or by accessing the call taxi service server 100 through a call taxi service application installed in the mobile communication terminal 10.

The call taxi service server 100 and the mobile communication terminal 10 may be connected to each other through any one of various communication networks, for example, through a communication network of a mobile carrier, such as third generation (3G), fourth generation (4G), or long term evolution (LTE), or through a wireless internet communication network, such as WiFi or Wibro. Also, the call taxi service server 100 and the call taxi control servers 300a through 300b may be connected to each other through any one of the above various communication networks.

The call taxi control servers 300a through 300n may be newly built for implementation of the present invention, but preferably, may be an existing control apparatus of a taxi company or a taxi control company, which is built for a call taxi service. The call taxi control servers 300a through 300n perform a function of calling a call taxi from the call taxi terminals 310a through 310n of registered call taxis and a function of dispatching a call taxi through human and physical networks built by the taxi company or the taxi control company. Hereinafter, for convenience of description, both of the taxi company and the taxi control company will be referred to as a taxi company.

Figure 2:
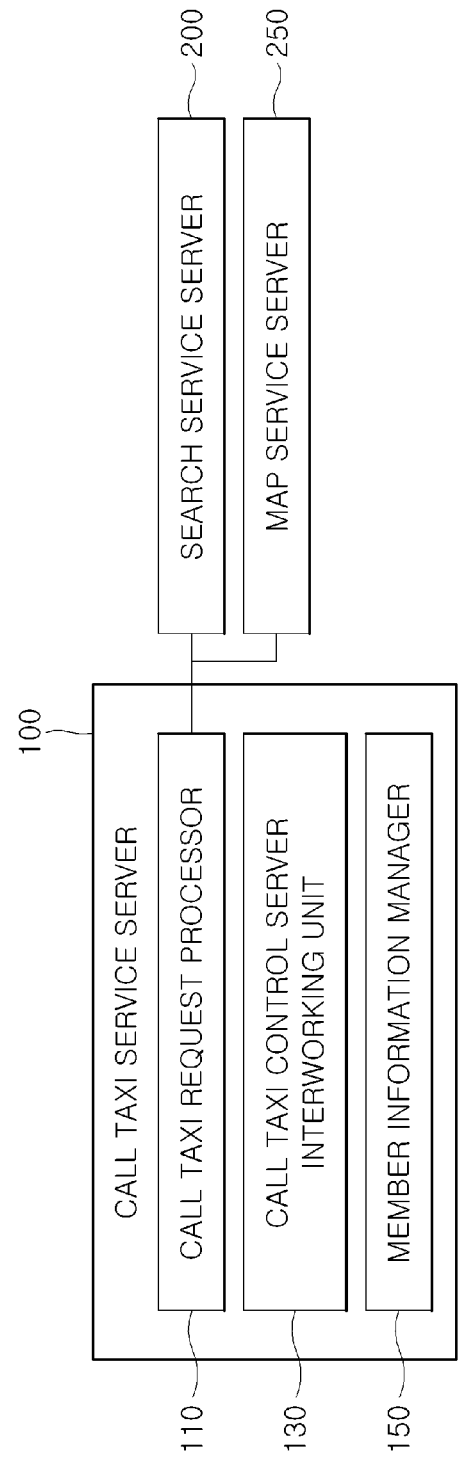
FIG. 2 is a block diagram of a call taxi service server according to an embodiment of the present invention.

The call taxi service server 100 that is a main component of the present invention will be described with reference to FIG. 2. FIG. 2 is a block diagram of the call taxi service server 100 according to an embodiment of the present invention.

The call taxi service server 100 includes a call taxi request processor 110, a call taxi control server interworking unit 130, and a member information manager 150. The call taxi request processor 110, the call taxi control server interworking unit 130, and the member information manager 150 may be configured as at least one microprocessor which may be controlled by at least one program stored in memory (not shown).

The call taxi request processor 110 processes use of a call taxi service from by the mobile communication terminal 10, wherein the call taxi request processor 110 provides a call taxi service screen to the mobile communication terminal 10, receives a call taxi request through the call taxi service screen, and generates call request information for requesting the call taxi control servers 300a through 300n to dispatch a call taxi. Also, the call taxi request processor 110 provides dispatch information about a dispatched call taxi to the mobile communication terminal 10.

In addition, the call taxi request processor 110 may provide a service for the user to select a call taxi company or a call taxi so as to increase convenience and efficiency of using the call taxi service, and may provide a service of providing expected route information from a departure point to a destination to the user or a service for the user to personally set a route.

Also, according to an embodiment of the present invention, the call taxi service may be provided in connection to an integral search service or a map search service frequently used by the user. In this case, the call taxi request processor 110 may interwork with a search service server 200 providing the integrated search service and a map service server 250 providing the map search service. For example, when the user searches for a call taxi through an integrated search service screen provided to the mobile communication terminal 10, the call taxi request processor 110 of the call taxi service server 100 may receive processing of the searching from the search service server 200 and provide a call taxi service screen to the mobile communication terminal 10. Alternatively, when the user selects a call taxi icon on a map search service screen provided to the mobile communication terminal 10, the call taxi request processor 110 of the call taxi service server 100 may receive processing of the selecting from the map service server 250 and provide a call taxi service screen to the mobile communication terminal 10. As such, the call taxi service server 100 may interwork with the search service server 200 or the map service server 250 to variously provide a call taxi service via a map or the like.

In FIG. 2, the call taxi service server 100, the search service server 200, and the map service server 250 are individual apparatuses, but according to an embodiment, the call taxi service server 100, the search service server 200, and the map service server 250 may be configured as one apparatus.

Also, the call taxi request processor 110 may process boarding and alighting processes of the user regarding a dispatched call taxi. The call taxi request processor 110 may generate boarding information by receiving boarding confirmation information from the mobile communication terminal 10 and generate moving route information of the user based on location information of the mobile communication terminal 10, and transmit the boarding information and the moving route information to a pre-set contact number or to a contact number input by the user. Also, the call taxi request processor 110 may receive alighting confirmation information of the user regarding the dispatched call taxi to calculate credibility of the user based on call taxi service using history or results of the user.

The call taxi control server interworking unit 130 interworks with the call taxi control servers 300a through 300n of taxi companies to request for a dispatch and generates dispatch information based on a dispatch response. Here, the call taxi control server interworking unit 130 requests the call taxi control servers 300a through 300n to dispatch a call taxi based on the call request information generated by the call taxi request processor 110, and generates and transmits dispatch information according to the dispatch response from the call taxi control servers 300a through 300n to the call taxi request processor 110.

In addition, the call taxi control server interworking unit 130 inquires of the call taxi control servers 300a through 300n about a dispatch function based on the call request information to receive dispatchability information, and generates and provides call taxi information based on the dispatchability information to the mobile communication terminal 10 through the call taxi request processor 110, thereby enabling the user to select a call taxi.

The member information manager 150 stores and manages personal information of the user, such as contact number information. Here, the member information manager 150 may store personal information according to separate subscription of the user to use the call taxi service, but according to an embodiment, may share member information of the user stored in the search service server 200 or the map service server 250. Also, the member information manager 150 may store the boarding information of the user regarding the dispatched call taxi or the moving route information, and provide a uniform resource locator (URL) of a storage location about where the boarding information or the moving route information is stored. In addition, the member information manager 150 may store the credibility information of the user correspondingly to the member information.

As such, the call taxi service may be provided by using the existing human and physical networks built by the taxi company through the call taxi service system, and a method of providing the call taxi service realized through the call taxi service system will now be described.

Figure 3:
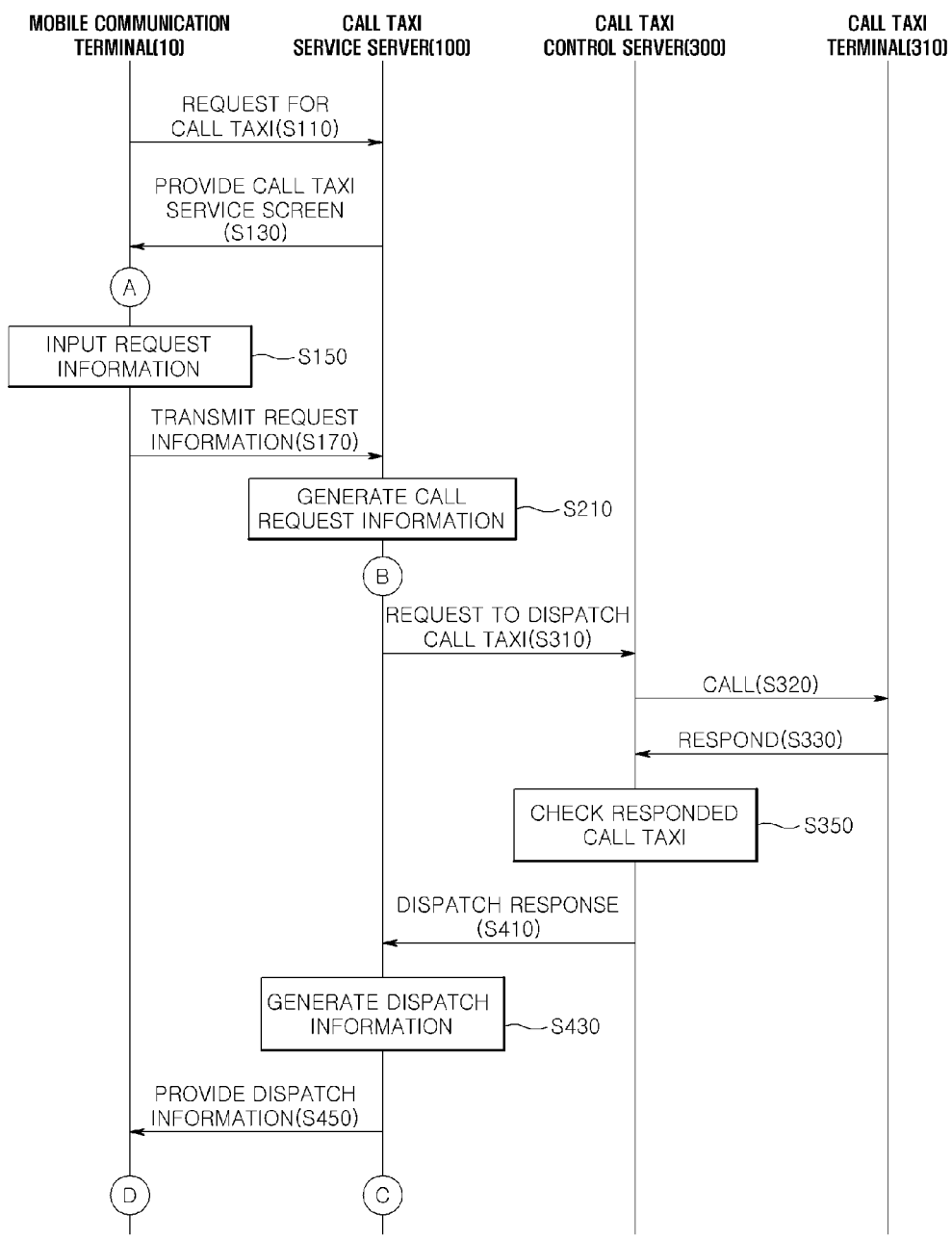
FIG. 3 is a flowchart of a method of providing a call taxi service, according to an embodiment of the present invention.

FIG. 3 is a flowchart of a method of providing a call taxi service, according to an embodiment of the present invention.

Referring to FIG. 3, according to the method, when the mobile communication terminal 10 requests the call taxi service server 100 for a call taxi in operation S110, the call taxi service server 100 provides a call taxi service screen to the mobile communication terminal 10 in operation S130.

Then, the user inputs request information for calling a call taxi through the call taxi service screen in operation S150. At this time, an input box for inputting departure point information, destination information, and member information of the user may be provided on the call taxi service screen, and when the user inputs the request information into the input box and the mobile communication terminal 10 transmits the request information to the call taxi service server 100 in operation S170, the call taxi request processor 110 of the call taxi service server 100 generates call request information based on the input information in operation S210. Information input to request for a call taxi may selectively change, and the call taxi service server 100 may automatically recognize the input information and generate the call request information. For example, the departure point information may be automatically recognized through the location information of the mobile communication terminal 10, and the member information of the user may be extracted and obtained from information stored in the member information manager 150 of the call taxi service server 100.

When the call taxi request processor 110 of the call taxi service server 100 generates the call request information, the call taxi control server interworking unit 130 of the call taxi service server 100 transmits the call request information to a call taxi control server 300 linked to the call taxi service server 100 to request the call taxi control server 300 to dispatch a call taxi in operation S310, receives a dispatch response in operation S410, and generate dispatch information in operation S430.

For example, a call taxi is dispatched through human and physical networks pre-built between the call taxi control server 300 and a call taxi terminal 310, and referring to processes performed between the call taxi control server 300 and the call taxi terminal 310, the call taxi server 300 calls the call taxi terminals 310 of a plurality of call taxis that are registered in the call taxi service in operation S320 according to a request to dispatch a call taxi from the call taxi service server 100, and when a call taxi driver responds to the request through the call taxi terminal 310 in operation S330, the call taxi control server 300 checks a responded call taxi in operation S350 and transmits a dispatch response to the call taxi service server 100 in operation S410.

Also, the call taxi control server interworking unit 130 of the call taxi service server 100 generates dispatch information in operation S430 based on the dispatch response received from the call taxi control server 300, and the call taxi request processor 110 of the call taxi service server 100 provides the dispatch information to the mobile communication terminal 10 in operation S450. Then, the user is able to use a call taxi according to the dispatch information from the call taxi service server 100.

As such, an embodiment of the present invention provides a method of providing a call taxi service by intactly using pre-existing human and physical network resources of a plurality of call taxi companies, and configurations and features of the method will now be described with reference to detailed embodiments.

Figure 4A:
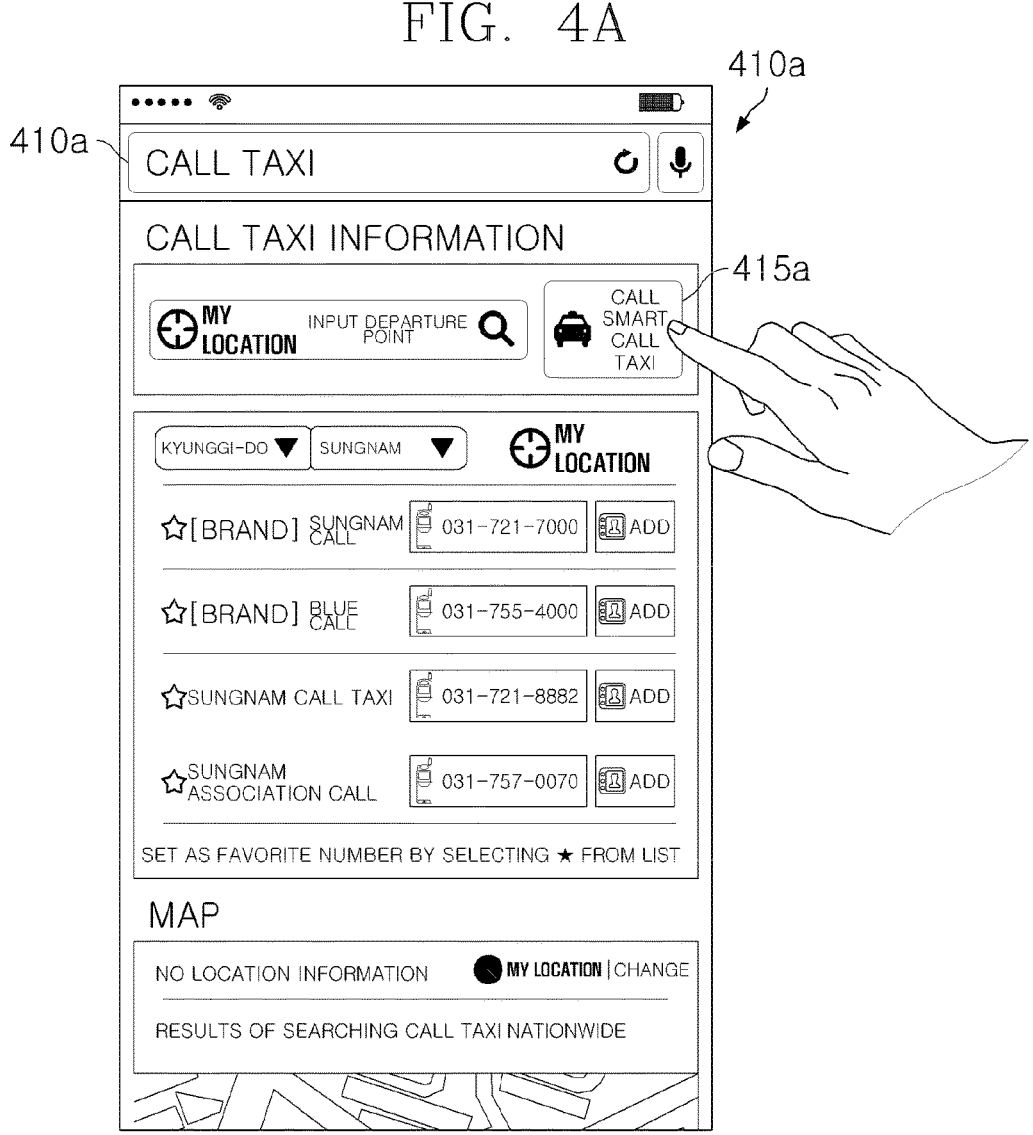
FIGS. 4A and 4B illustrate call taxi service screens in a method of providing a call taxi service, according to exemplary embodiments of the present invention.
Figure 4B:
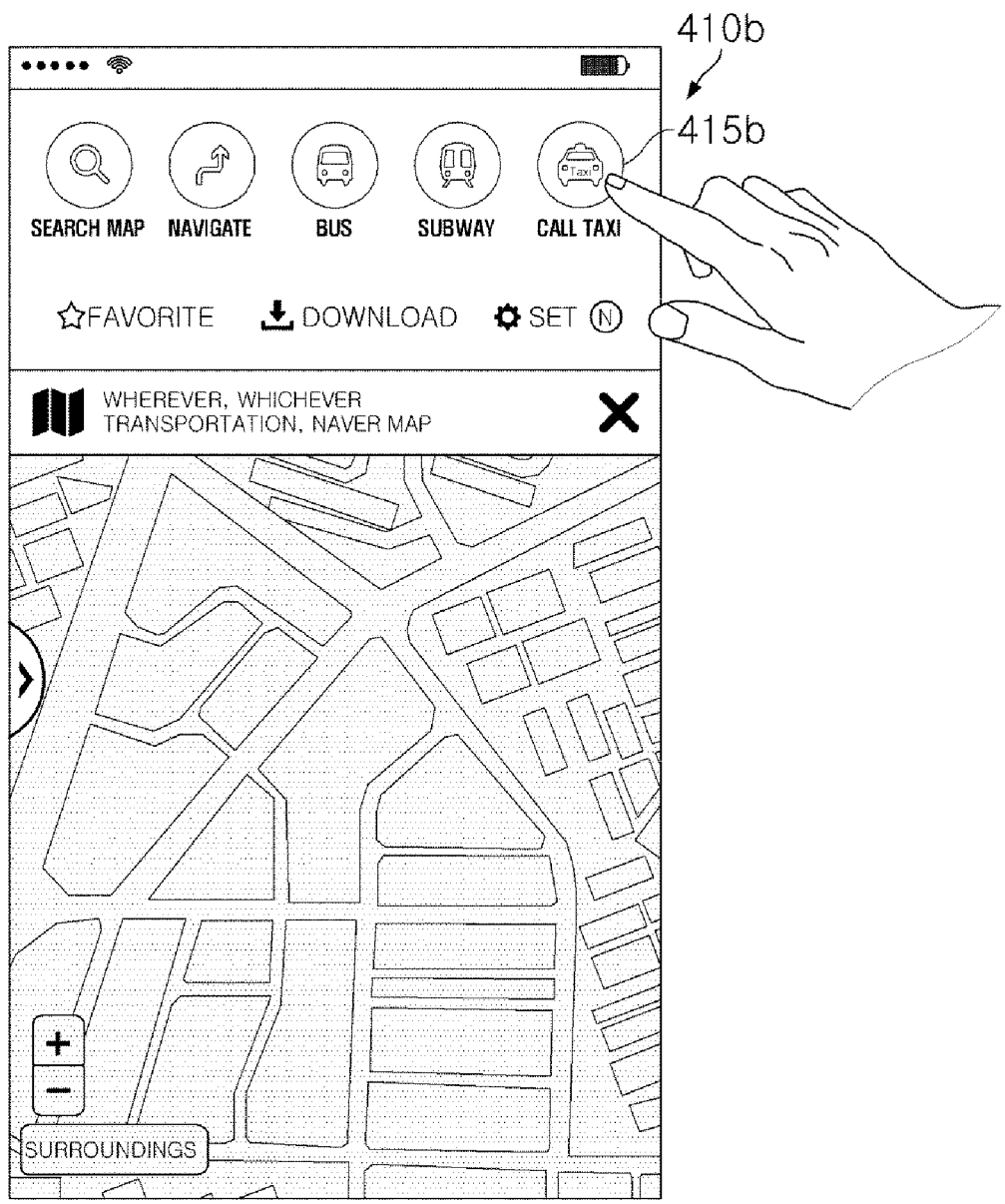

First, a process of requesting for a call taxi as the mobile communication terminal 10 of the user is connected to the call taxi service server 100 may vary, and such a process will now be described with reference to FIGS. 4A and 4B. FIGS. 4A and 4B illustrate call taxi service screens according to exemplary embodiments of the present invention.

FIG. 4A illustrates a screen in which the call taxi service is provided through an integrated search service. When the user searches for a call taxi on an integrated search service screen provided by the search service server 200 to the mobile communication terminal 10, the search service server 200 provides a search service screen 410a to the mobile communication terminal 10. Here, the search service screen 410a includes an icon 415a linked to the call taxi service, and when the user selects the icon 415a, the search service server 200 requests the call taxi service server 100 to provide the call taxi service and the call taxi request processor 110 of the call taxi service server 100 provides a call taxi request screen for the call taxi service to the mobile communication terminal 10.

Also, FIG. 4B illustrates a screen in which the call taxi service is provided through a map search service. A map search service screen 410b provided by the map service server 250 to the mobile communication terminal 10 includes a call taxi service icon 415b, and when the user selects the call taxi service icon 415b, the map service server 250 requests the call taxi service server 100 to provide the call taxi service, and the call taxi request processor 110 of the call taxi service server 100 provides a call taxi request screen for the call taxi service to the mobile communication terminal 10.

Here, the call taxi service may be provided through a call taxi service webpage or a call taxi service application in connection to the integrated search service or the map search service. In other words, the call taxi service webpage may be linked to and provided from the integrated search service screen 410a or the map search service screen 410b, or the call taxi service screen may be provided as the call taxi service application is driven when the icon 415a or the call taxi service icon 415b is selected.

As such, according to an embodiment of the present invention, by providing the call taxi service in connection to the integrated search service or the map search service easily accessed and frequently used by the user, the user may easily receive the call taxi service without separate manipulation.

Figure 5:
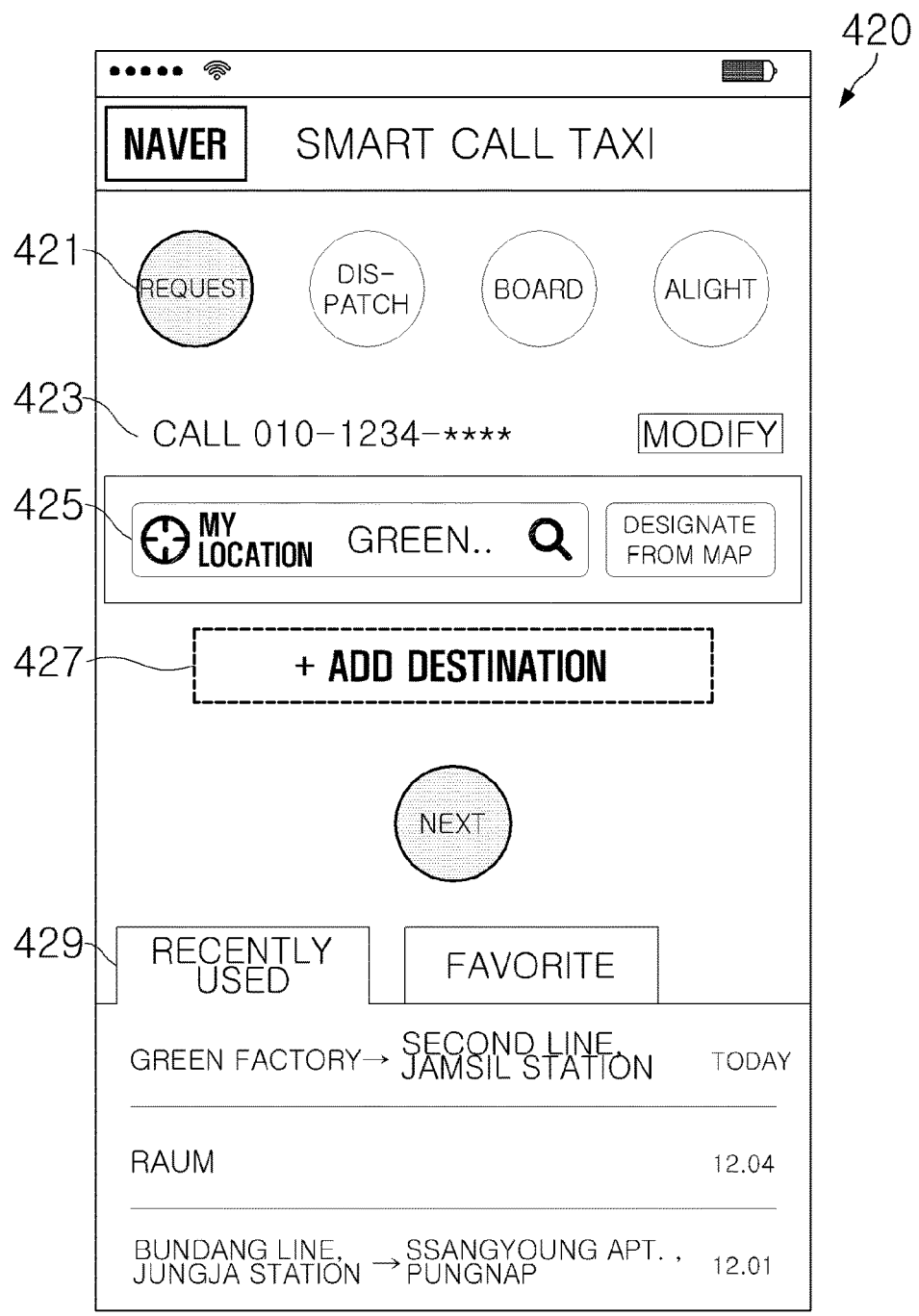
FIG. 5 illustrates a call taxi request screen in a method of providing a call taxi service, according to an embodiment of the present invention.

An example of an initial call taxi request screen provided by the call taxi service server 100 according to a request to dispatch a call taxi from the mobile communication terminal 10 will now be described with reference to FIG. 5. FIG. 5 illustrates a call taxi request screen 420 according to an embodiment of the present invention.

The call taxi request screen 420 provided by the call taxi request processor 110 of the call taxi service server 100 to the mobile communication terminal 10 includes an input box for generating call request information and various types of information. For example, as shown in FIG. 5, the call taxi request screen 420 may include contact number information 423 and history information 429 of using a recent call taxi service, which are stored in the member information manager 150 of the call taxi service server 100. Also, the user may directly input departure point information, but if the user selects a location recognition icon 425, the call taxi service server 100 may generate the departure point information by directly recognizing location information of the mobile communication terminal 10. Also, a destination information input box 427 is provided for the user to selectively input destination information.

When the user inputs or checks request information and selects a request icon 421 through the call taxi request screen 420, the call taxi request processor 110 of the call taxi service server 100 generates call request information based on the various types of information and the input information on the call taxi request screen 420.

As such, since various types of information for requesting for a call taxi are generated through user information input by a user, automatically recognized, or stored, inconvenient processes for requesting for a call taxi may be omitted.

Figure 6A:
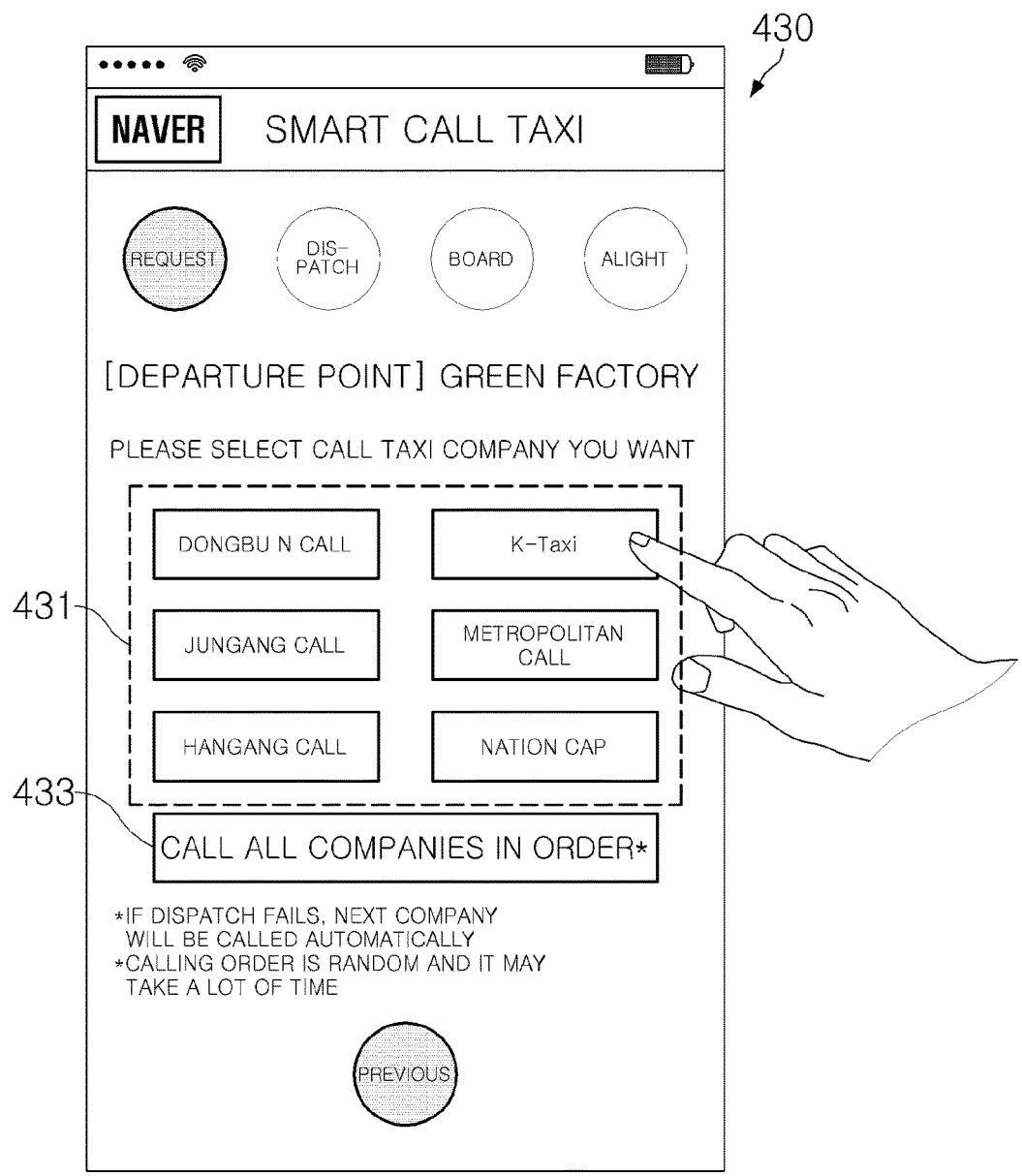
FIGS. 6A and 6B illustrate screens for selecting, by a user, a call taxi company in a method of providing a call taxi service, according to exemplary embodiments of the present invention.
Figure 6B:
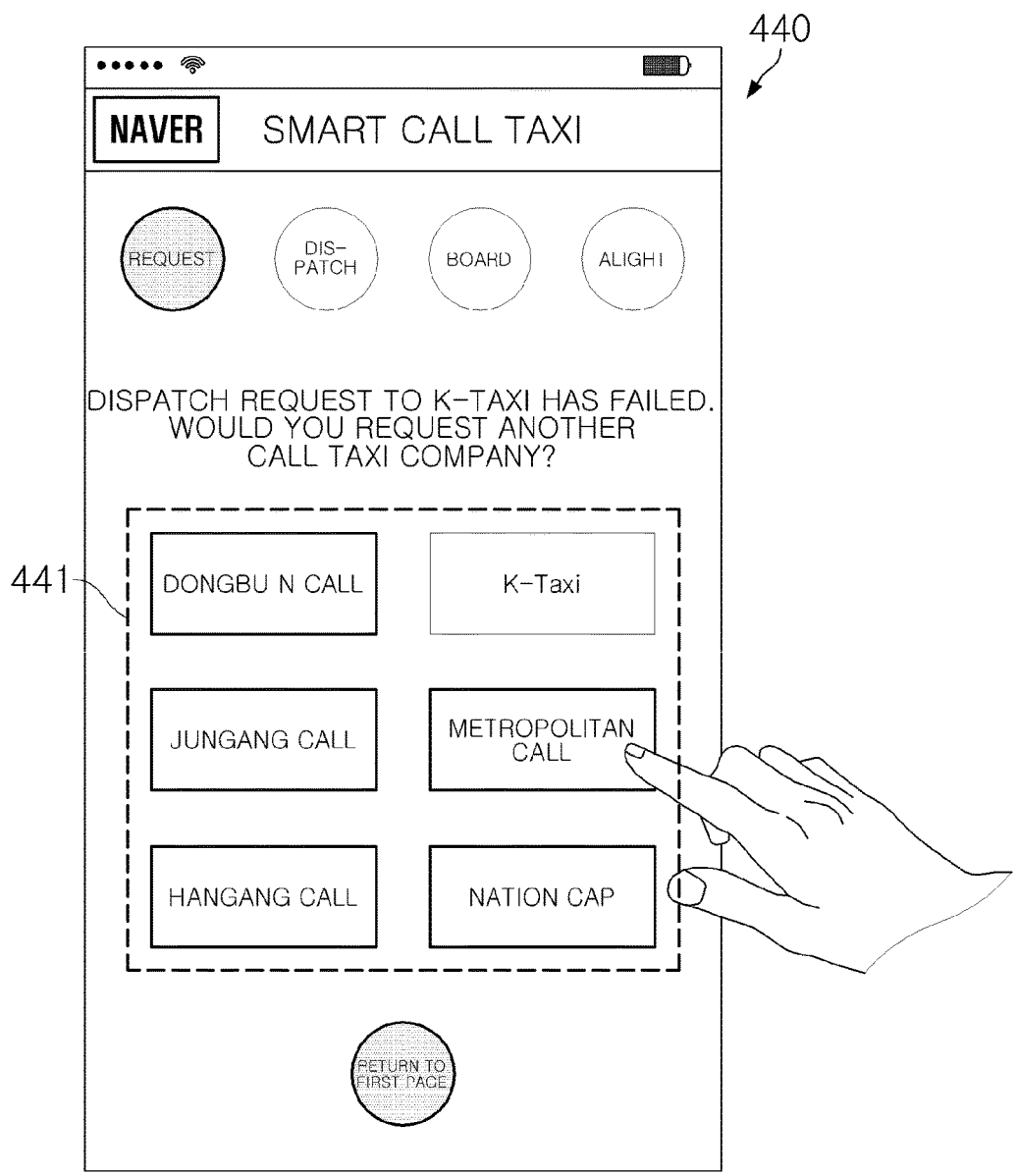

In addition, since a call taxi service is performed in connection to a plurality of call taxi control servers 300a-300n, any one of various methods of selecting one of the call taxi control servers to request to dispatch a call taxi may be used. FIGS. 6A and 6B illustrate screens of selecting, by the user, a call taxi company in the method, according to exemplary embodiments of the present invention.

In FIGS. 6A and 6B, the user selects a call taxi company and the selected call taxi company is requested to dispatch a call taxi. When the call taxi request processor 110 of the call taxi service server 100 generates the call request information, the call taxi control server interworking unit 130 of the call taxi service server 100 provides a screen 430 in which a plurality of pieces of call taxi company information 431 are suggested to the mobile communication terminal 10 through the call taxi request processor 110. Then, when the user selects a call taxi company from the plurality of pieces of call taxi company information 431, the call taxi control server interworking unit 130 of the call taxi service server 100 requests a call taxi control server corresponding to the selected call taxi company to dispatch a call taxi. If the call taxi control server 300 corresponding to the selected call taxi company does not respond or transmits a dispatch inability response, information that a request to dispatch a call taxi failed is provided as shown in FIG. 6B, and a screen 440 in which a plurality of pieces of call taxi company information 441 are provided is provided again to the mobile communication terminal 10 for the user to select another call taxi company. At this time, the call taxi company failed to dispatch a call taxi may be removed from or may be differently displayed in the plurality of pieces of call taxi company information 441.

In addition, when the user selects an icon 433 for selecting all taxi companies to request to dispatch a call taxi in FIG. 6A, the call taxi control server interworking unit 130 of the call taxi service server 100 requests a plurality of call taxi companies to dispatch a call taxi. As one method of requesting the plurality of call taxi companies to dispatch a call taxi, call taxi control servers 300a-300n corresponding to the call taxi companies may be requested to dispatch a call taxi according to a pre-set order of the call taxi companies, wherein when a pre-set response time exceeds or a dispatch inability response is received, a call taxi control server corresponding to a next call taxi company may be requested to dispatch a call taxi. At this time, the pre-set order may be set by the user or may be set based on credibility of the call taxi companies evaluated through reviews or the like.

As another method of requesting the plurality of call taxi companies to dispatch a call taxi, the call taxi control server interworking unit 130 of the call taxi service server 100 may simultaneously request the call taxi control servers 300a-300n corresponding to the call taxi companies to dispatch a call taxi, and upon receiving a dispatch response from at least one call taxi control server, select the dispatch response of the call taxi control server that first transmitted the dispatch response.

As such, according to an embodiment, by providing a call taxi service by using human and physical networks of a plurality of call taxi companies, the human and physical networks for the call taxi service become abundant, and thus a dispatch success rate of a call taxi may be increased and a dispatch time may be reduced.

The call taxi service server 100 enables the user to easily check the dispatched call taxi by providing the dispatch information about the dispatched call taxi to the mobile communication terminal 10 of the user. In this regards, FIG. 7 illustrates a screen for providing the dispatch information according to an embodiment of the present invention.

The call taxi control server interworking unit 130 of the call taxi service server 100 receives the dispatch response from the call taxi control server 300 and generates the dispatch information based on the dispatch response, and the call taxi request processor 110 of the call taxi service server 100 provides the dispatch information to the mobile communication terminal 10 of the user. Referring to the dispatch information provided through the screen of FIG. 7, a dispatch information screen 450 provides departure point information according to a call taxi request and information about a dispatched call taxi 455, and a location of the dispatched call taxi 455 is provided on a map screen.

In order to provide location information of the dispatched call taxi 455, the dispatch response transmitted from the call taxi control server 300 may include the location information of the dispatched call taxi 455 or connection information regarding the call taxi terminal 310 of the dispatched call taxi 455. When the dispatch response includes the location information, the call taxi service server 100 may provide the location of the dispatched call taxi 455 on the map screen based on the location information. When the dispatch response includes the connection information, the call taxi service server 100 may directly request the call taxi terminal 310 for the location information, and provide the location of the dispatched call taxi 455 on the map screen based on the location information received from the call taxi terminal 310.

Figure 7:
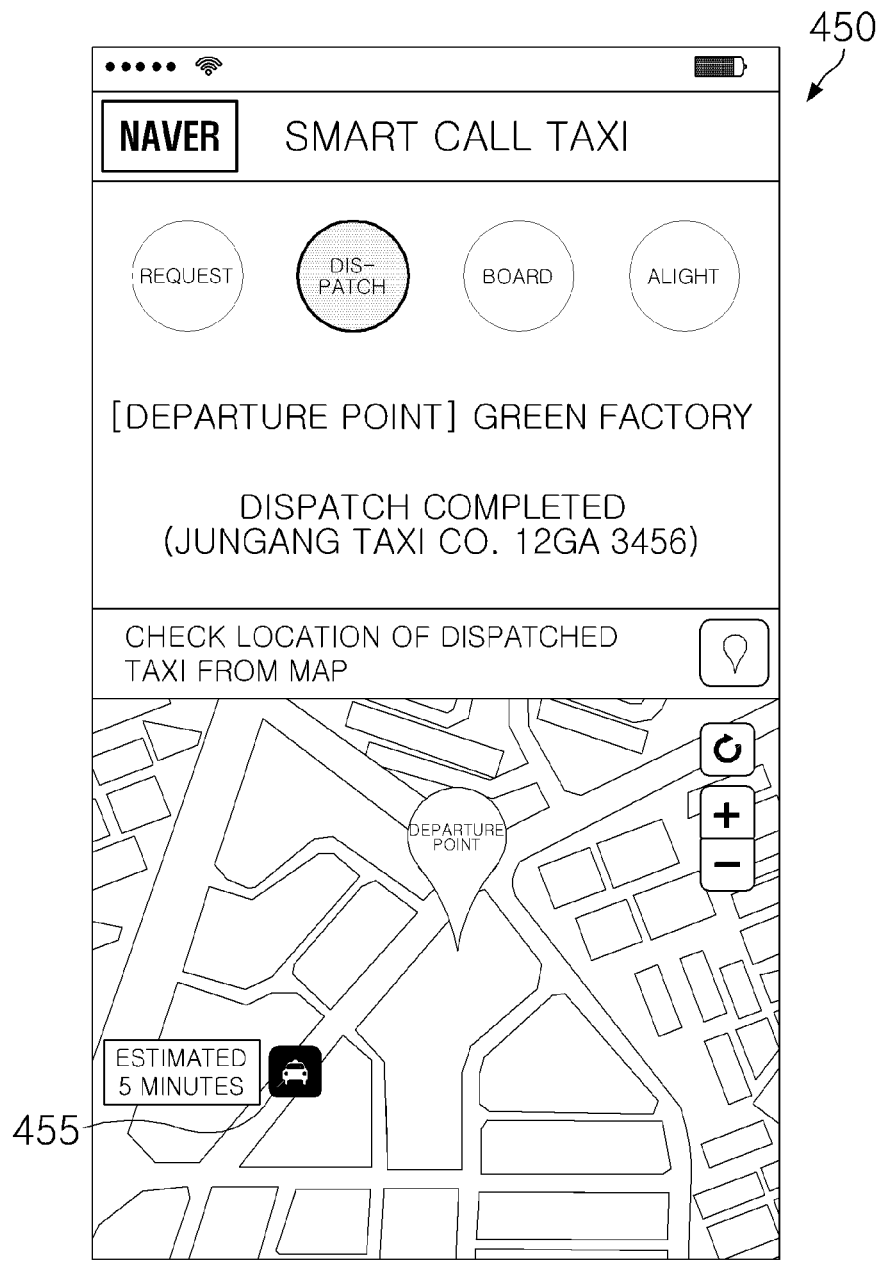
FIG. 7 illustrates a screen for providing dispatch information in a method of providing a call taxi service, according to an embodiment of the present invention.

As shown in FIG. 7, the time taken to arrive at a departure point may be provided based on the location information of the dispatched call taxi 455. Also, in addition, various types of information about the dispatched call taxi 455 may be provided. At this time, the dispatch information generated by the call taxi control server interworking unit 130 of the call taxi service server 100 may include various types of information, such as taxi company information, taxi type information, license plate number information, and driver information. Such various types of information are added to the dispatch response transmitted from the call taxi control server 300 and transmitted to the call taxi control server interworking unit 130 of the call taxi service server 100, and thus the call taxi control server interworking unit 130 of the call taxi service server 100 may generate and provide the dispatch information including the various types of information.

As such, according to an embodiment of the present invention, various types of information about a dispatched call taxi are provided, and thus the user is able to easily check the dispatched call taxi.

Figure 8:
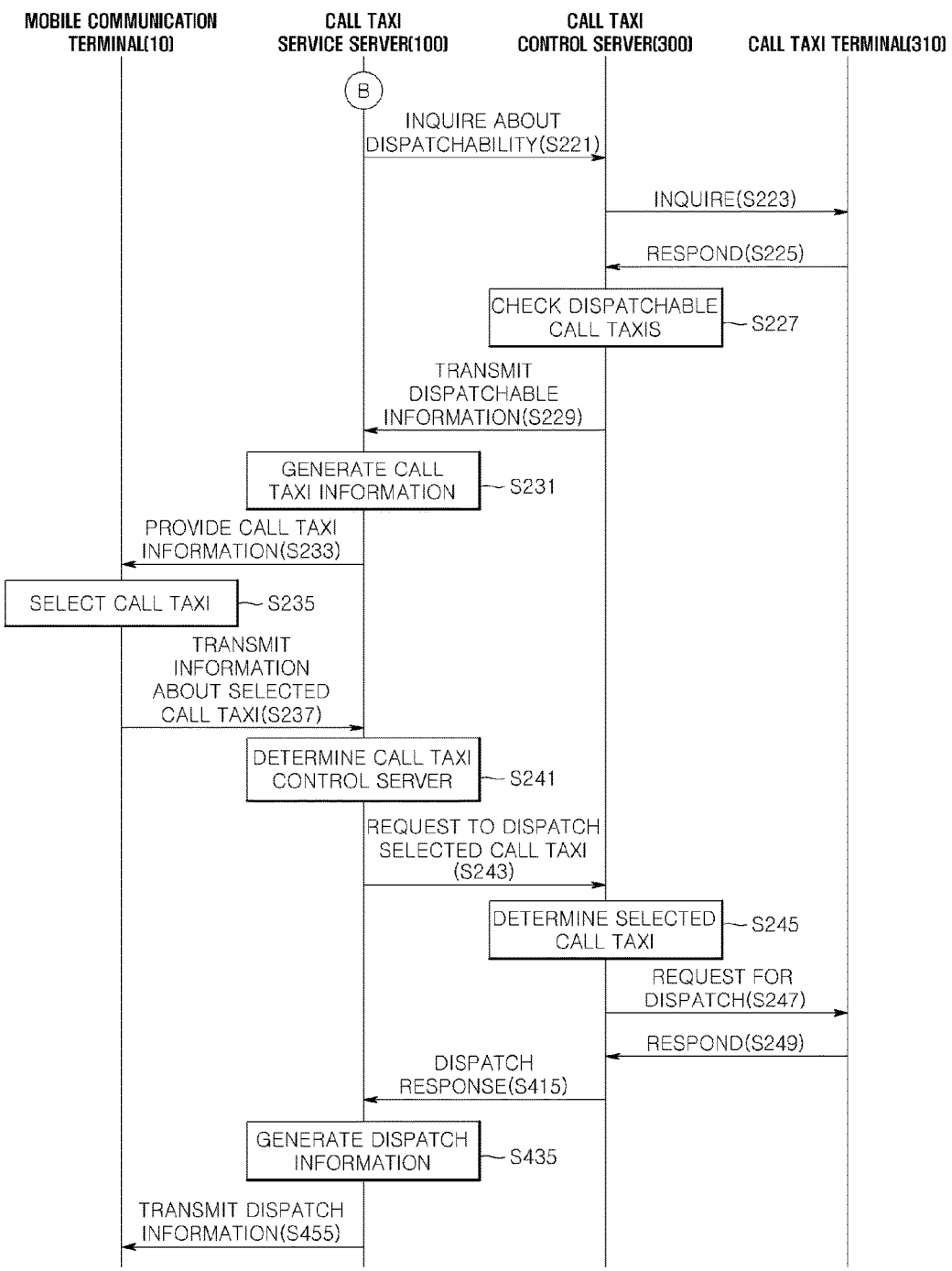
FIG. 8 is a flowchart of an operation of selecting, by a user, a call taxi in a method of providing a call taxi service, according to an embodiment of the present invention.

In addition, according to an embodiment of the present invention, information about dispatchable call taxis may be provided to the user such that the user personally selects a call taxi. In this regards, FIG. 8 is a flowchart of an operation of selecting, by the user, a call taxi according to an embodiment of the present invention.

The call taxi control server interworking unit 130 of the call taxi service server 100 inquires of the at least one call taxi control server 300 about a dispatchable call taxi based on the call request information generated by the call taxi request processor 110 of the call taxi service server 100, in operation S221. During the inquiry, information such as the departure point information and the destination information according to the call request information may be transmitted, and credibility information of the user stored in the member information manager 150 of the call taxi service server 100 may be transmitted.

According to the inquiry about a dispatchable taxi, the call taxi control server 300 inquires of the call taxi terminals 310 of the call taxis about dispatchability, in operation S223. Upon receiving a response about dispatchability from the call taxi terminals 310 of dispatchable call taxis in operation S225, the call taxi control server 300 checks the dispatchable call taxis in operation S227 and transmits the dispatchability information to the call taxi service server 100 in operation S229.

The call taxi control server interworking unit 130 of the call taxi service server 100 generates call taxi information respectively for dispatchability information in operation S231, and at this time, the call taxi information may include various types of information, such as taxi company information, taxi type information, license plate number information, driver information, and taxi location information. Of course, it is presumed that such various types of information are included in the dispatchability information transmitted from the call taxi control server 300.

The call taxi request processor 110 of the call taxi service server 100 provides the call taxi information generated by the call taxi control server interworking unit 130 to the mobile communication terminal 10 in operation S233, and the user may select a call taxi based on the call taxi information in operation S235.

When the call taxi service server 100 receives information about the call taxi selected by the user from the mobile communication terminal 10 in operation S237, the call taxi service server 100 determines the call taxi control server 300 of the selected call taxi in operation S241 and request the call taxi control server 300 to dispatch the selected call taxi in operation S243. While requesting to dispatch the selected call taxi, information for determining the selected call taxi is transmitted, for example, license plate number information is transmitted, such that the call taxi control server 300 determines the selected call taxi.

The call taxi control server 300 determines the selected call taxi in operation S245 and requests the call taxi terminal 310 of the selected call taxi for dispatch in operation S247. When the selected call taxi responds to the dispatch through the call taxi terminal 310 in operation S249, the call taxi control server 300 transmits a dispatch response that the selected call taxi is dispatched to the call taxi service server 100 in operation S415.

Then, the call taxi control server interworking unit 130 of the call taxi service server 100 generates dispatch information in operation S435, and the call taxi request processor 110 transmits the dispatch information about the selected call taxi to the mobile communication terminal 10 in operation S455.

Figure 9:
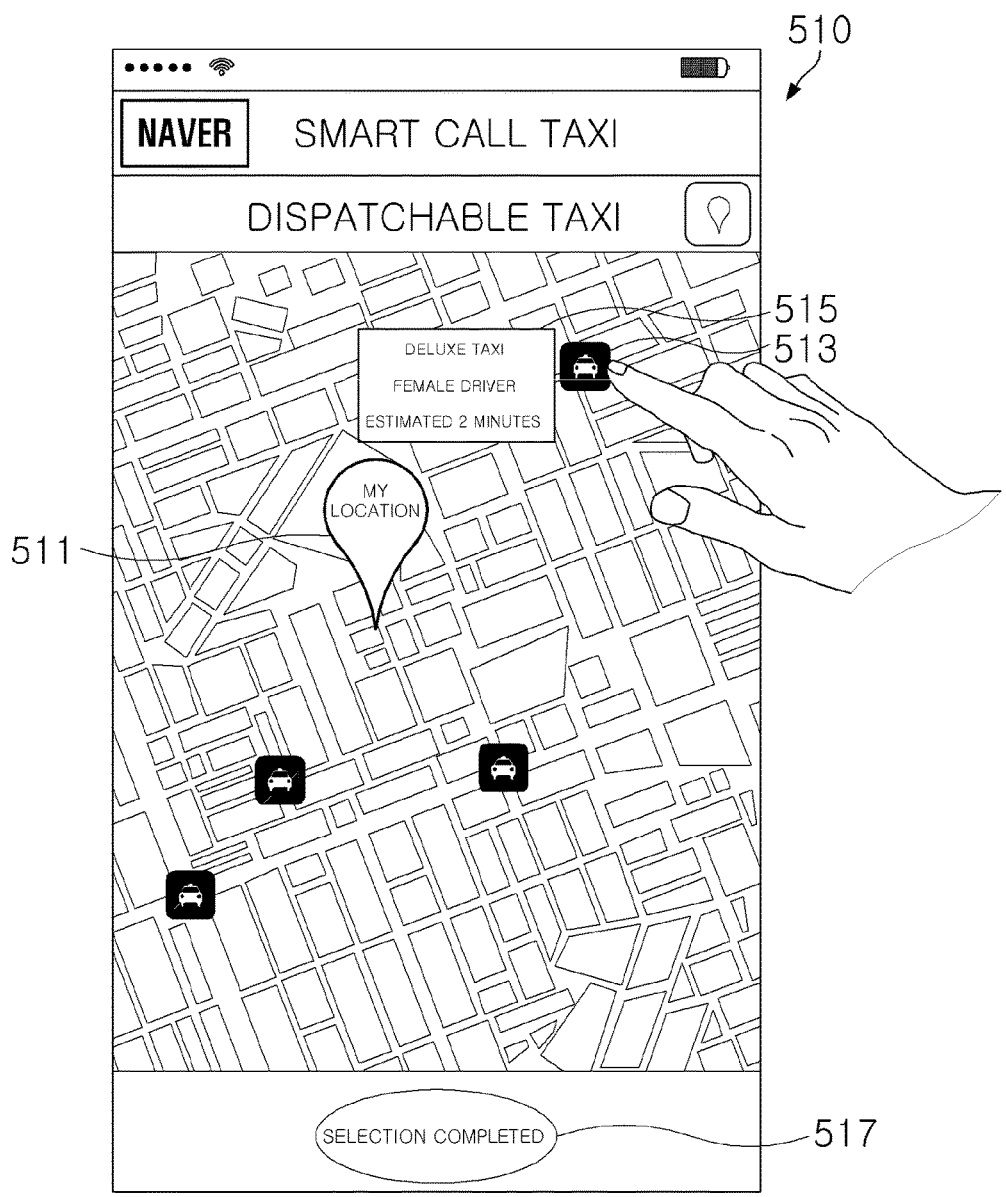
FIG. 9 illustrates a screen for selecting, by a user, a call taxi in a method of providing a call taxi service, according to an embodiment of the present invention.

FIG. 9 illustrates a screen 510 for selecting, by the user, a call taxi according to an embodiment of the present invention.

In FIG. 9, the screen 510 provided to the mobile communication terminal 10 includes a plurality of pieces of call taxi information according to dispatchability information received from the at least one call taxi control server 300 as the call taxi service server 100 inquires of a plurality of the call taxi control servers 300 about dispatchability based on call request information.

On the screen 510, a plurality of dispatchable call taxis are provided on a map screen based on a location 511 of the user, and when the user selects a call taxi 513 from among the dispatchable call taxis, call taxi information 515 about the call taxi 513 is provided. The call taxi information 515 includes various types of information, such as taxi type information, driver information, and estimated arrival time according to a location of the call taxi 513.

When the user selects a desired call taxi based on call taxi information of the dispatchable call taxis and then touches "selection completed" 517, the mobile communication terminal 10 transmits information about the desired call taxi to the call taxi service server 100 and the call taxi service server 100 performs dispatch processes for the desired call taxi selected by the user.

As such, according to an embodiment of the present invention, the user may receive information about dispatchable call taxis and select a desired call taxi based on the received information. Specifically, the user may safely use a call taxi since information about a taxi company and a driver is pre-provided.

Furthermore, according to an embodiment of the present invention, a service in which expected route information is provided to the user and the user personally selects a route is provided. In this regard, FIG. 10 is a flowchart of an operation of providing driving route information according to an embodiment of the present invention.

Figure 10:
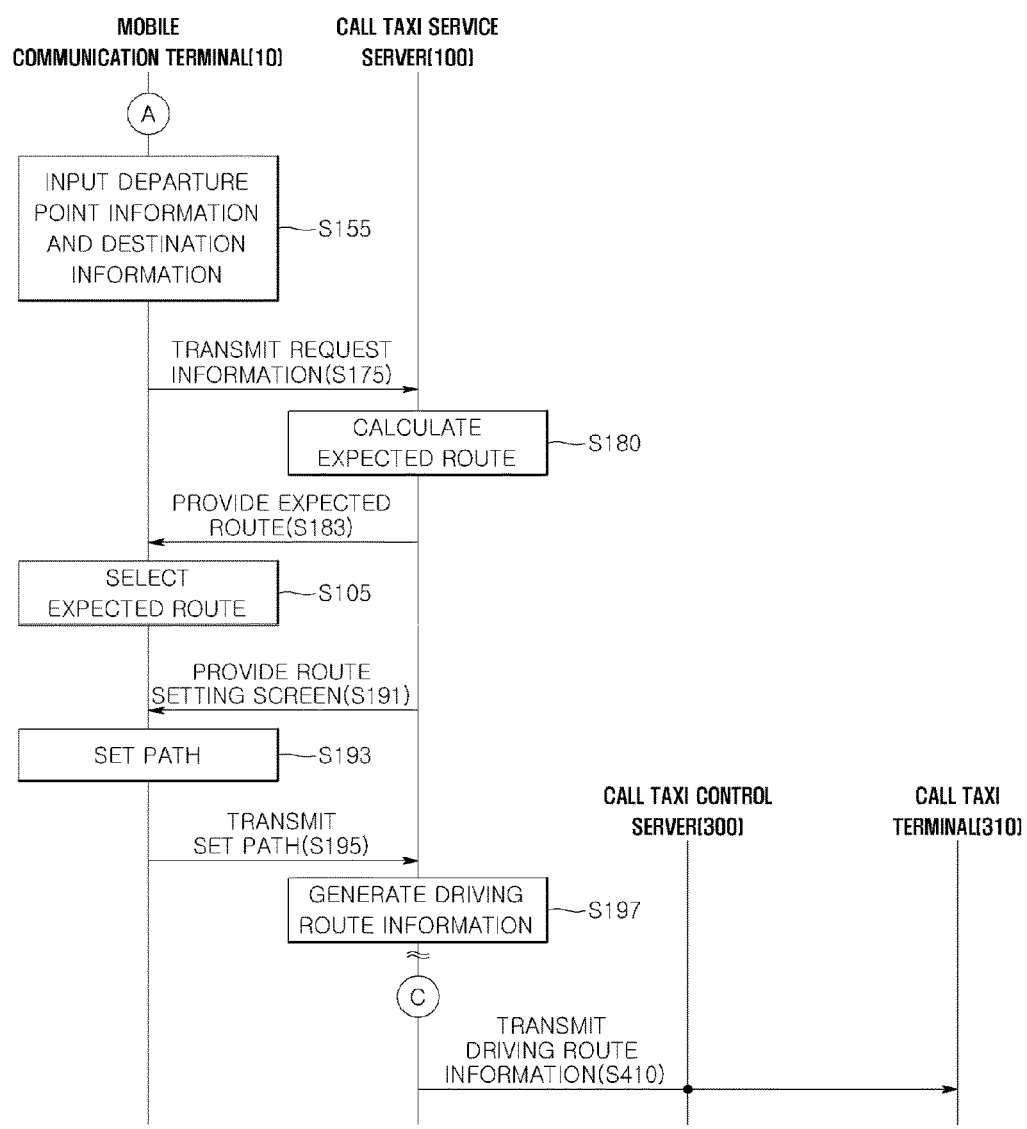
FIG. 10 is a flowchart of an operation of providing driving route information in a method of providing a call taxi service, according to an embodiment of the present invention.

Here, operations after a reference point A in FIG. 10 are performed after a reference point A in FIG. 3, and an operation after a reference point C in FIG. 10 is performed after a reference point C in FIG. 3.

When the call taxi service server 100 provides the call taxi request screen for the call taxi service to the mobile communication terminal 10, the user inputs information, such as the departure point information and the destination information, in operation S155 as the request information through the mobile communication terminal 10. At this time, as described above, the request information may be generated via automatic recognition or automatic extraction such that the user may not have to input the request information.

When the mobile communication terminal 10 transmits the request information in operation S175, the call taxi request processor 110 of the call taxi service server 100 calculates at least one expected route in operation S180 based on the departure point information and the destination information and provides the at least one expected route to the mobile communication terminal 10 in operation S183.

Here, the expected route may be calculated based on various conditions, such as the shortest distance, the shortest time, and the optimum fare.

When the user selects a desired expected route from among the at least one expected route in operation S105 and transmits the desired expected route to the call taxi service server 100 through the mobile communication terminal 10, the call taxi request processor 110 of the call taxi service server 100 generates driving route information based on the desired expected route.

In addition, the user may set a path, and in this regard, the call taxi request processor 110 of the call taxi service server 100 provides a route setting screen to the mobile communication terminal 10 in operation S191. The user may set a path in operation S193 by modifying the desired expected route through the route setting screen and then transmit the set path to the call taxi request processor 110 of the call taxi service server 100 through the mobile communication terminal 10 in operation S195. Then, the call taxi request processor 110 of the call taxi service server 100 generates the driving route information in operation S197 based on the route set by the user.

Then, when a call taxi is dispatched via interworking between the call taxi service server 100 and the call taxi control server 300, the call taxi control server interworking unit 130 of the call taxi service server 100 transmits the driving route information generated by the call taxi request processor 110 of the call taxi service server 100 to the call taxi terminal 310 of the dispatched call taxi. At this time, the call taxi control server interworking unit 130 of the call taxi service server 100 transmits the driving route information to the call taxi control server 300, and the call taxi control server 300 transmits the driving route information to the call taxi terminal 310 of the dispatched call taxi in operation S410. Alternatively, the dispatch response transmitted from the call taxi control server 300 described above may include the connection information about the call taxi terminal 310 of the dispatched call taxi, and when the call taxi service server 100 receives the connection information, the call taxi control server interworking unit 130 of the call taxi service server 100 may transmit the driving route information directly to the call taxi terminal 310 of the dispatched call taxi by using the connection information, without going through the call taxi control server 300.

According to an embodiment of the present invention, an expected driving route may be provided to the user and the user may select a desired route. In this regard, FIGS. 11A and 11B illustrate screens for providing expected route information according to exemplary embodiments of the present invention.

Figure 11A:
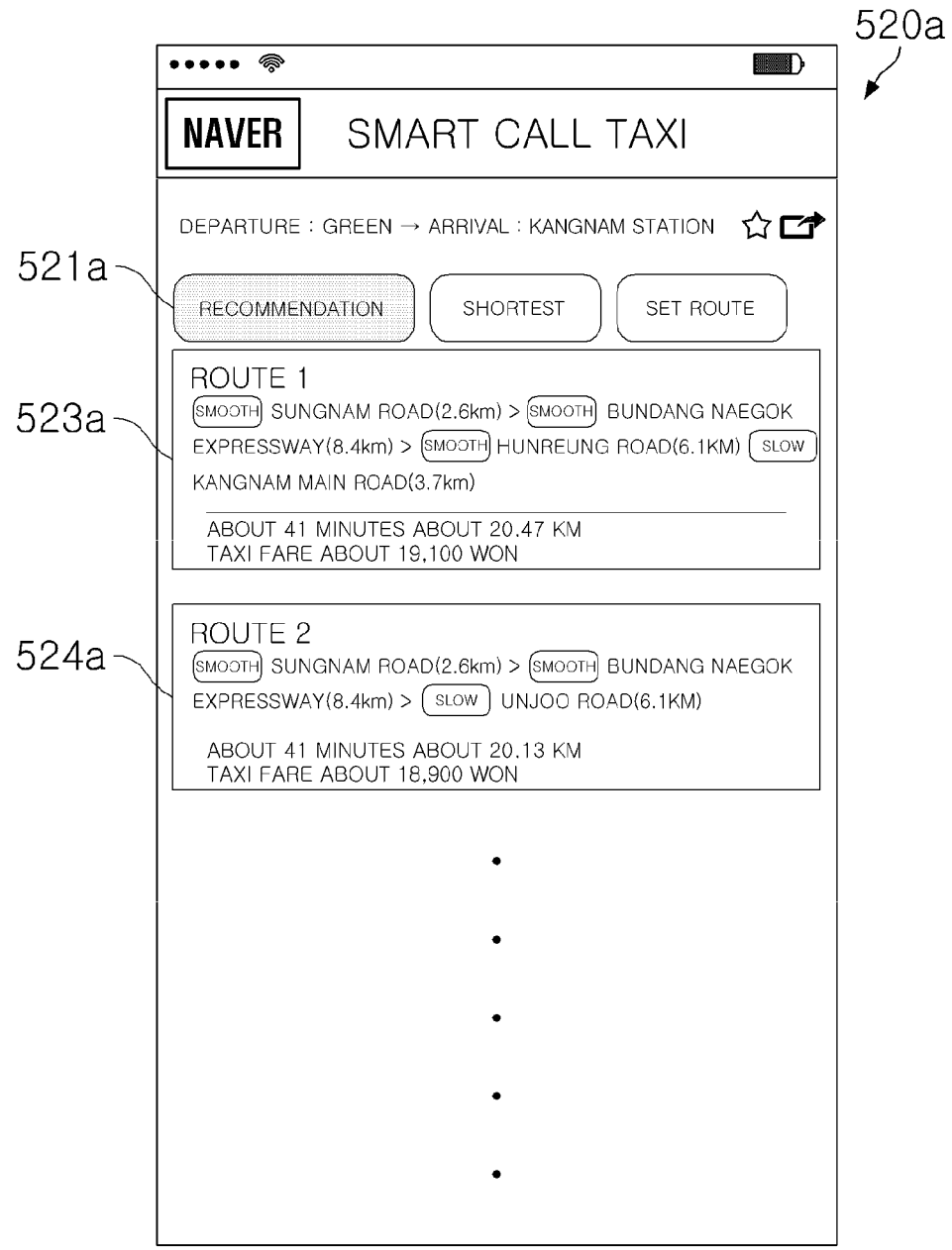
FIGS. 11A and 11B illustrate screens for providing expected route information in a method of providing a call taxi service, according to exemplary embodiments of the present invention.

In FIG. 11A, various types of expected route information 523a and 524a are provided as recommended routes 521a to the user through an expected route providing screen 520a, and at this time, various types of information, such as a driving time, a driving distance, and a taxi fare, may be provided together with a route summary. The user may select a desired route from among the expected route information 523a and 524a.

Figure 11B:
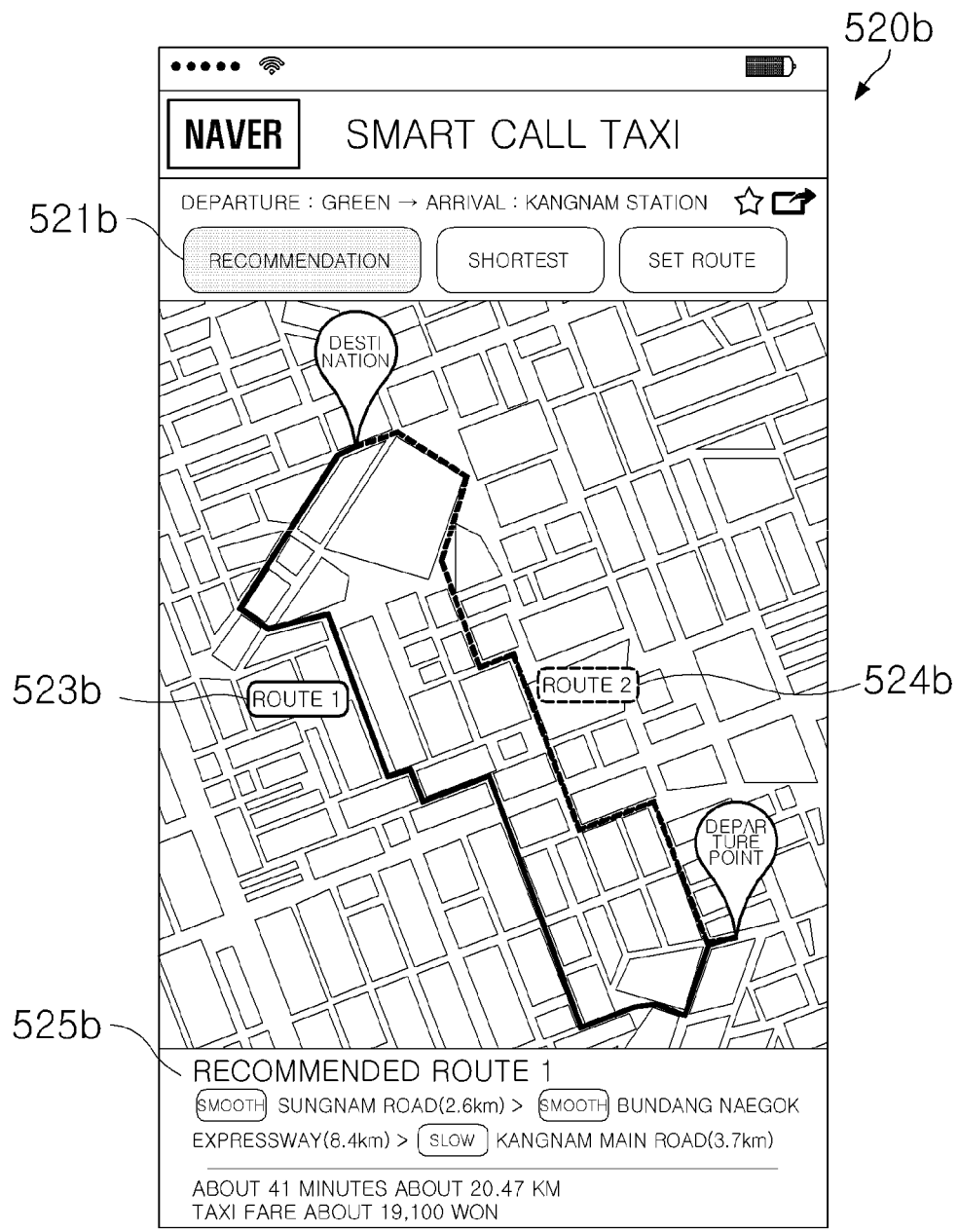

In addition, in FIG. 11B, expected routes are provided on a map screen 520b. At this time, various types of expected route information 523b and 254b may be provided as recommended routes 521b to the user on the map screen 520b, and when the user selects the expected route information 523b, various types of information 525b, such as a driving time, a driving distance, and a taxi fare, may be provided together with a summary of the expected route information 523b. Also, the expected route information 523b on the map screen 520b may be divided according to traffic conditions, for example, a smooth section, a slow section, and a delay section, which are shown in different colors. As such, by providing an expected route on a map screen, the user may determine route information at once.

According to an embodiment of the present invention, an expected driving route may be provided and the user may select a route. In this regard, FIGS. 12A through 12C illustrate screens for setting, by the user, a driving route according to an embodiment of the present invention.

Figure 12A:
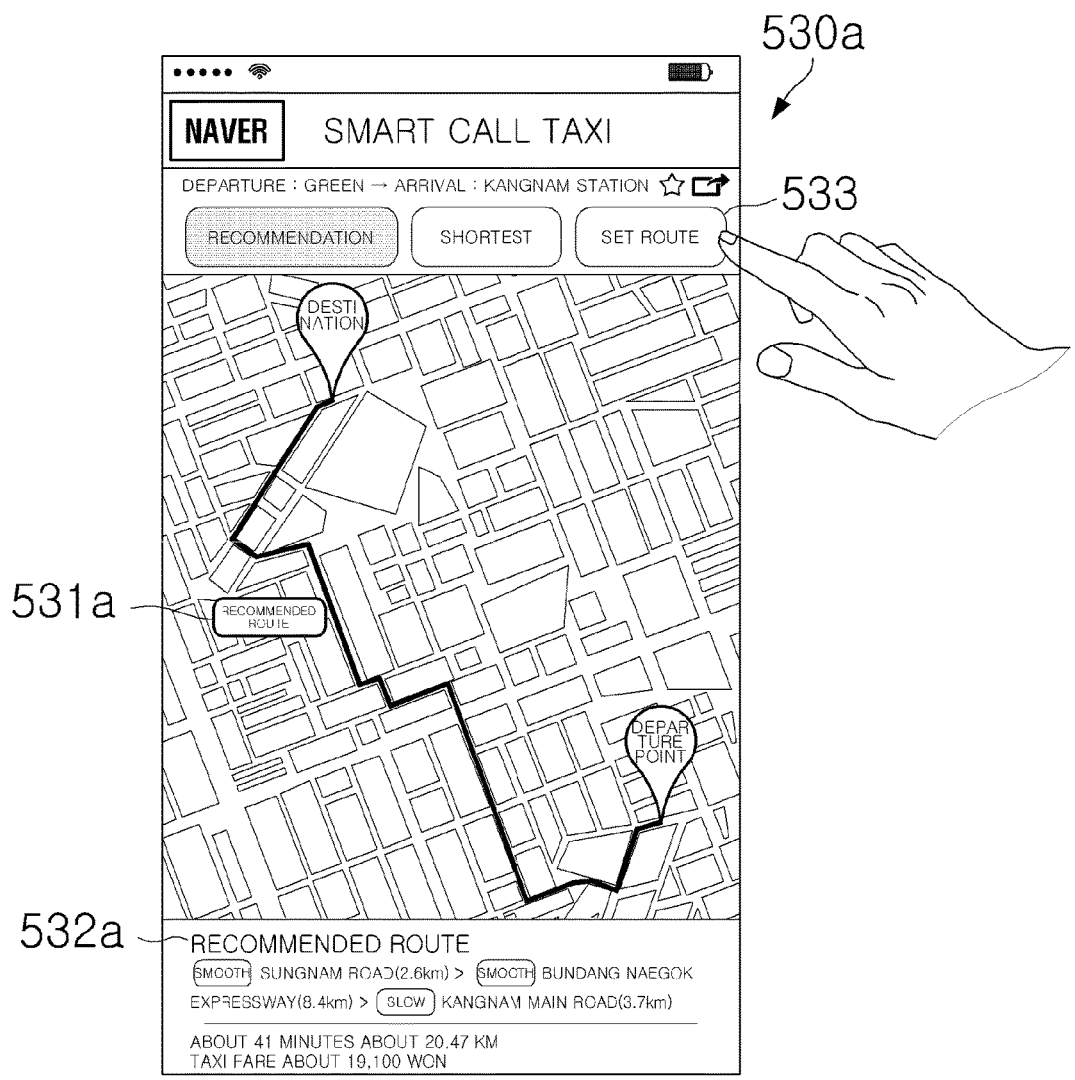
FIGS. 12A through 12C illustrate screens for setting, by a user, a driving route in a method of providing a call taxi service, according to an embodiment of the present invention.
Figure 12B:
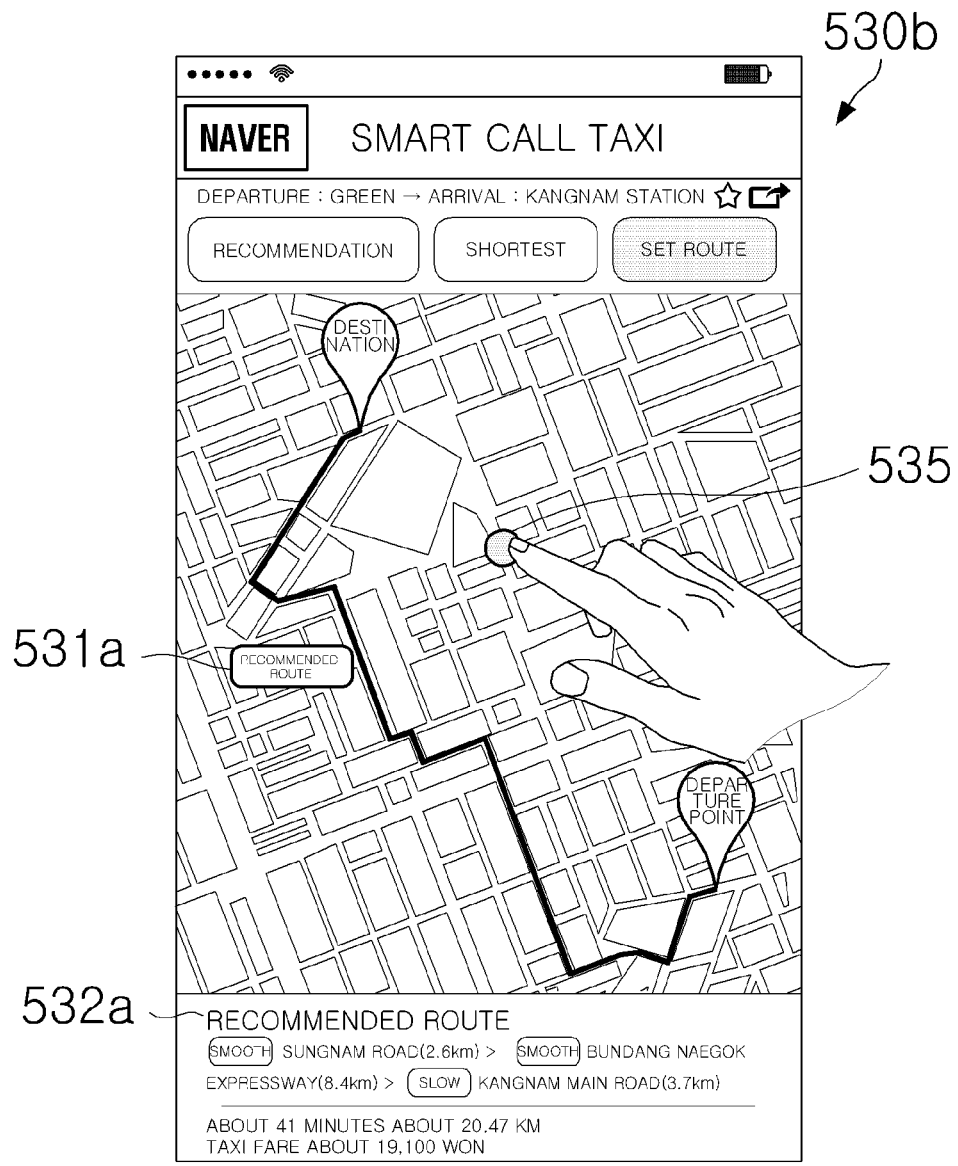
Figure 12C:
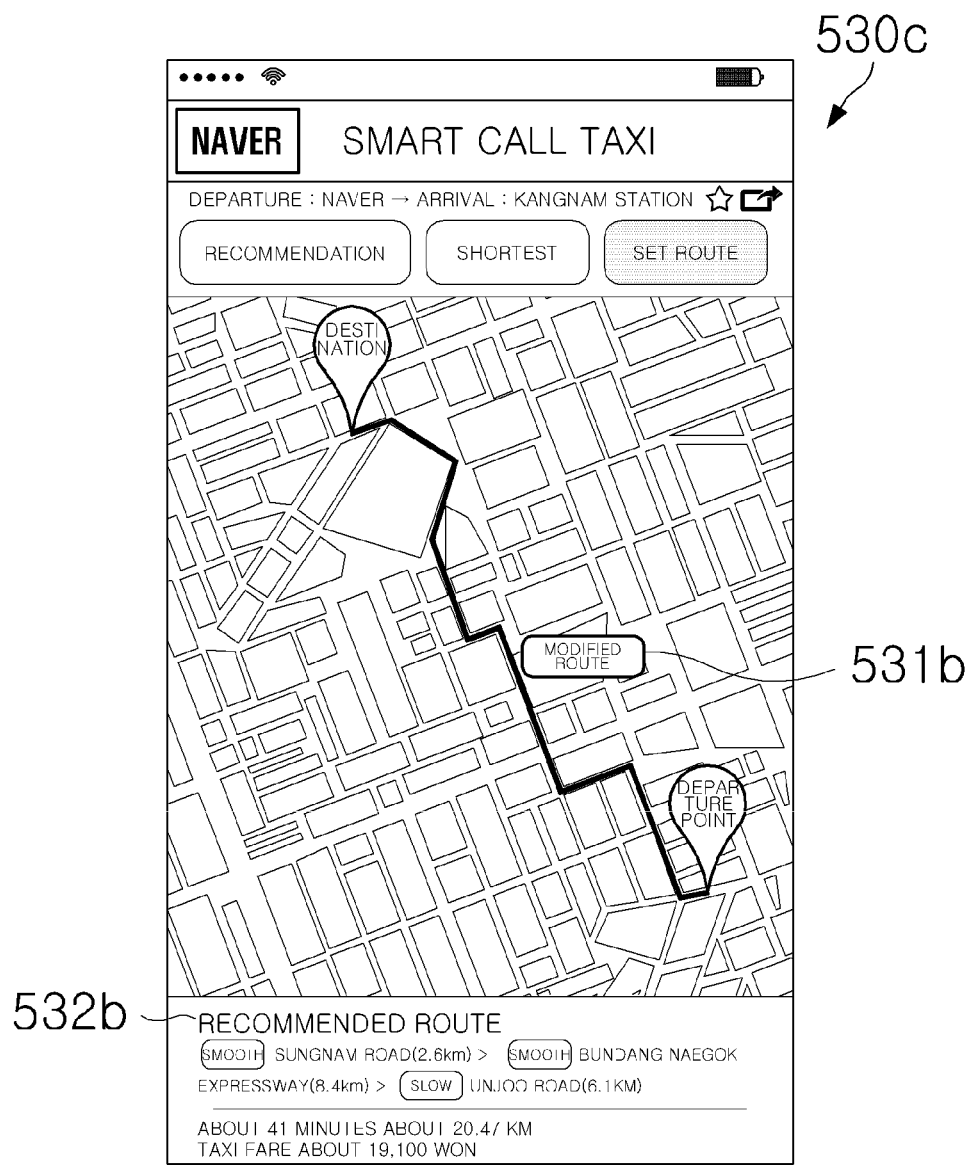

FIG. 12A illustrates an expected route screen 530a in which a recommended expected route 531a and various types of route information 532a are shown. When the user selects a route setting icon 533 on the expected route screen 530a and then selects a desired via point 535 on a path setting map screen 530b of FIG. 12B, a modified route 531b from a departure point to a destination through the desired via point 535, and route information 532b about the modified route 531b are provided as shown in a screen 530c of FIG. 12C.

As such, according to an embodiment of the present invention, various expected routes are provided to the user and the user may select a desired route or directly set a route, thereby blocking a taxi driver from maliciously taking a detour route.

Figure 13:
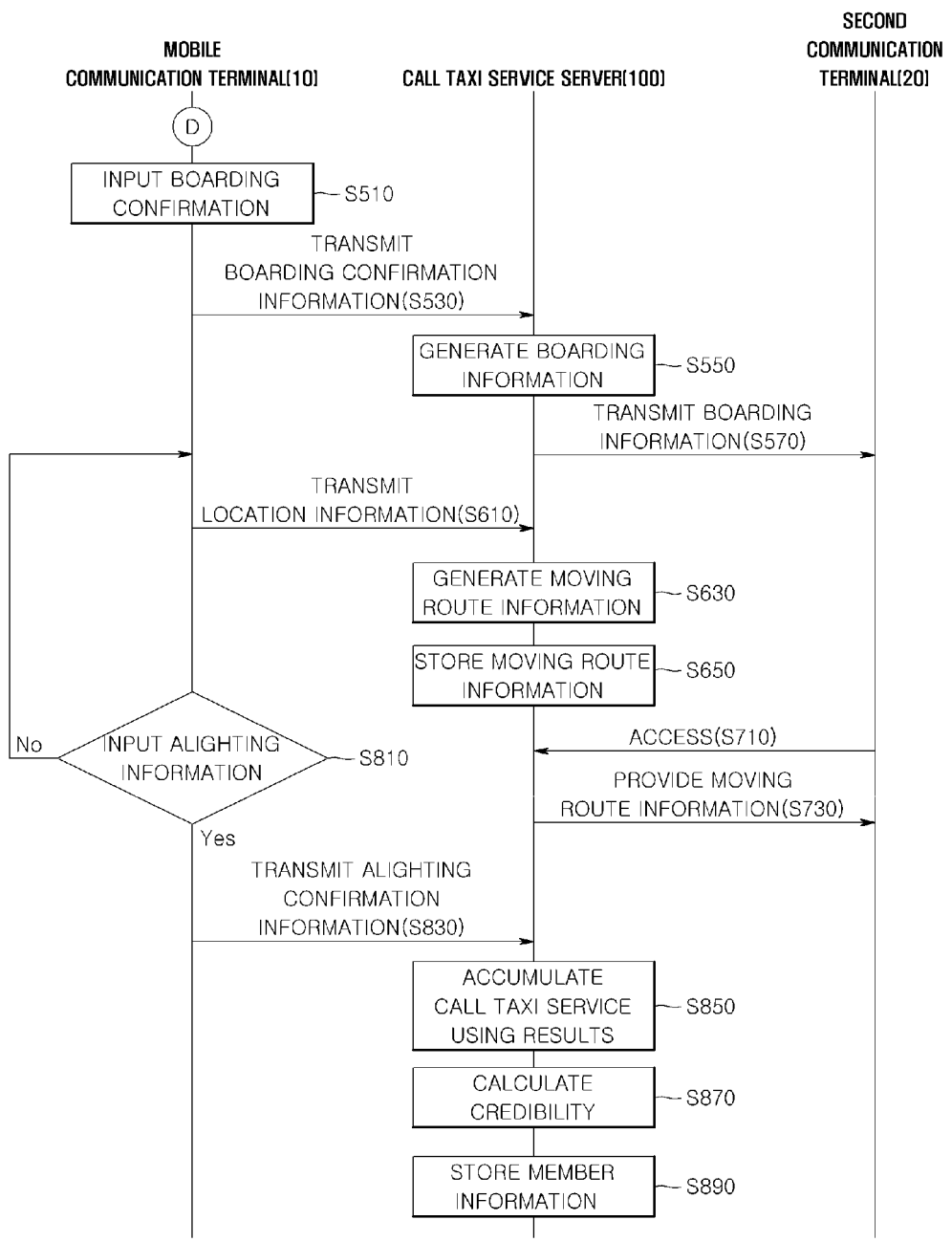
FIG. 13 is a flowchart of an operation of boarding and alighting from a dispatched call taxi in a method of providing a call taxi service, according to an embodiment of the present invention.

An operation of processing boarding and alighting from a dispatched call taxi is now described. FIG. 13 is a flowchart of an operation of boarding and alighting from a dispatched call taxi according to an embodiment of the present invention.

Operations after a reference point D in FIG. 13 are performed after a reference point D in FIG. 3.

After the user boards the dispatched call taxi, the user may input a boarding confirmation through the mobile communication terminal 10 in operation S510 to transmit boarding confirmation information to the call taxi service server 100 in operation S530.

Upon receiving the boarding confirmation information from the mobile communication terminal 10, the call taxi request processor 110 of the call taxi service server 100 generates boarding information in operation S550. The boarding information may include the dispatch information generated by the call taxi service server 100 as the user requests for a call taxi through the call taxi service.

The call taxi request processor 110 of the call taxi service server 100 transmits the boarding information to a contact number pre-set correspondingly to the user or a contact number input by the user, in operation S570, and accordingly, a second mobile communication terminal 20 corresponding to the contact number receives the boarding information. A process of transmitting the boarding information to the second mobile communication terminal 20 may also be performed when the user selects to transmit the boarding information.

In addition, the call taxi request processor 110 of the call taxi service server 100 may receive location information from the mobile communication terminal 10 periodically or in real time in operation S610 and generate moving route information of the user in operation S630 based on the location information, and the member information manager 150 of the call taxi service server 100 may store the moving route information in operation S650. Operations S630 and S650 may be repeatedly performed until the user inputs alighting information in operation S810 through the mobile communication terminal 10 and alighting confirmation information is transmitted to the call taxi service server 100 in operation S830. For example, the member information manager 150 of the call taxi service server 100 may generate URL information about a storage location in which the moving route information is to be stored, and the call taxi request processor 110 of the call taxi service server 100 may transmit the boarding information including the URL information to the second mobile communication terminal 20.

Also, when the second mobile communication terminal 20 accesses the storage location in which the moving route information is stored through the URL information included in the boarding information in operation S710, the moving route information is provided to the second mobile communication terminal 20 in operation S730.

Figure 14:
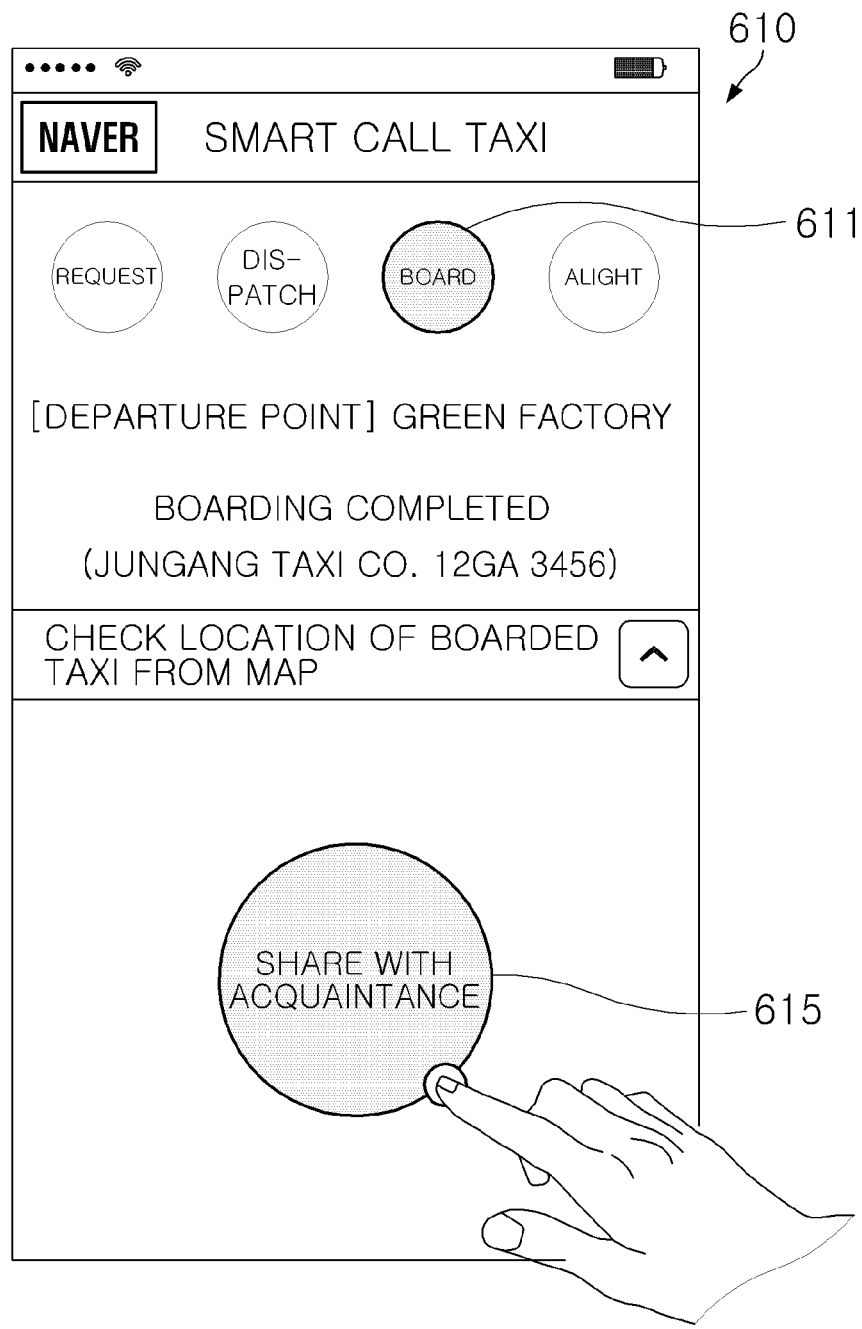
FIG. 14 illustrates a screen for transmitting boarding information to an acquaintance when a user boards a dispatched call taxi in a method of providing a call taxi service, according to an embodiment of the present invention.

According to an embodiment of the present invention, when the user boards the dispatched call taxi, the boarding information may be transmitted to an acquaintance. In this regard, FIG. 14 illustrates a boarding confirmation screen 610 provided to the mobile communication terminal 10 to input the boarding confirmation information. When the user selects a board icon 611 on the boarding confirmation screen 610, information that the user boarded the dispatched call taxi is transmitted to the call taxi service server 100, and the call taxi service server 100 generates the boarding information based on the dispatch information. Also, when the user selects an acquaintance share icon 615 on the boarding confirmation screen 610, the boarding information is transmitted to the contact number pre-set correspondingly to the user. Alternatively, a screen for inputting a contact number to which the boarding information is to be transmitted may be provided.

When the user requests to send the boarding information to an acquaintance as shown in FIG. 14, the call taxi service server 100 transmits the boarding information to the second mobile communication terminal 20 of the acquaintance. In this regard, FIG. 15 illustrates a screen on the mobile communication terminal 10 showing the boarding information transmitted to the acquaintance when the user boards the dispatched call taxi according to an embodiment of the present invention.

Figure 15:
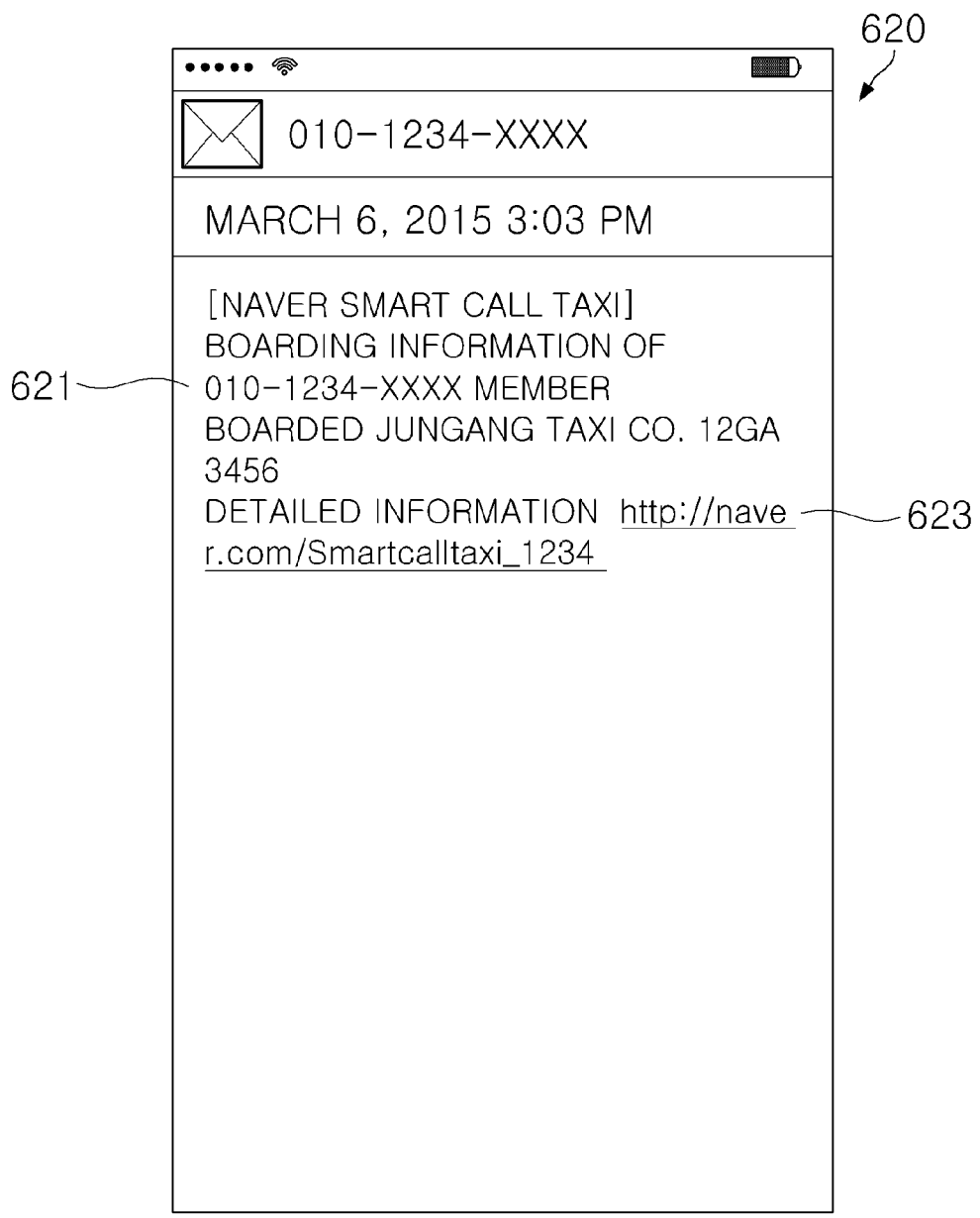
FIG. 15 illustrates a screen for boarding information transmitted to an acquaintance when a user boards a dispatched call taxi in a method of providing a call taxi service, according to an embodiment of the present invention.

A boarding information providing screen 620 of FIG. 15 is an example of the boarding information transmitted in text message. A contact number of the user is provided as information for identifying the user, and boarding information 621 of the user regarding the dispatched call taxi is provided. In addition, URL information 623 for checking additional boarding information and the moving route information of the user is provided.

The acquaintance of the user not only checks the boarding information of the user through the second mobile communication terminal 20, but also checks a current moving route of the user by accessing the storage location of the moving route information through the URL information 623. In this regard, FIGS. 16A and 16B illustrate screens for providing the moving route information of the user according to exemplary embodiments.

When the second mobile communication terminal 20 accesses the call taxi service server 100 through the URL information 623, the moving route information stored in the storage location indicated by the URL information 623 is provided to the second mobile communication terminal 20.

Figure 16A:
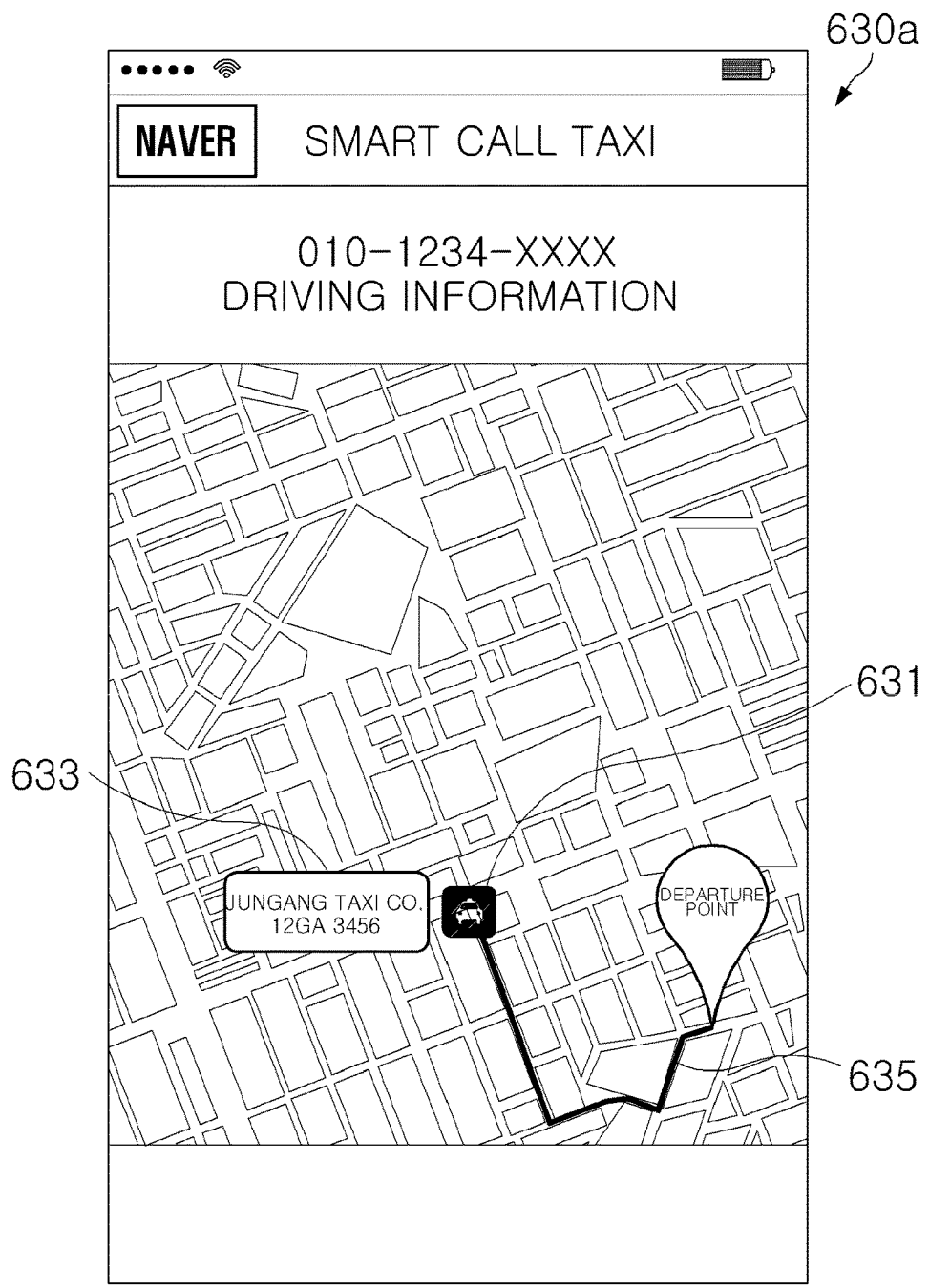
FIGS. 16A and 16B illustrate screens for providing moving route information of a user in a method of providing a call taxi service, according to exemplary embodiments.
Figure 16B:
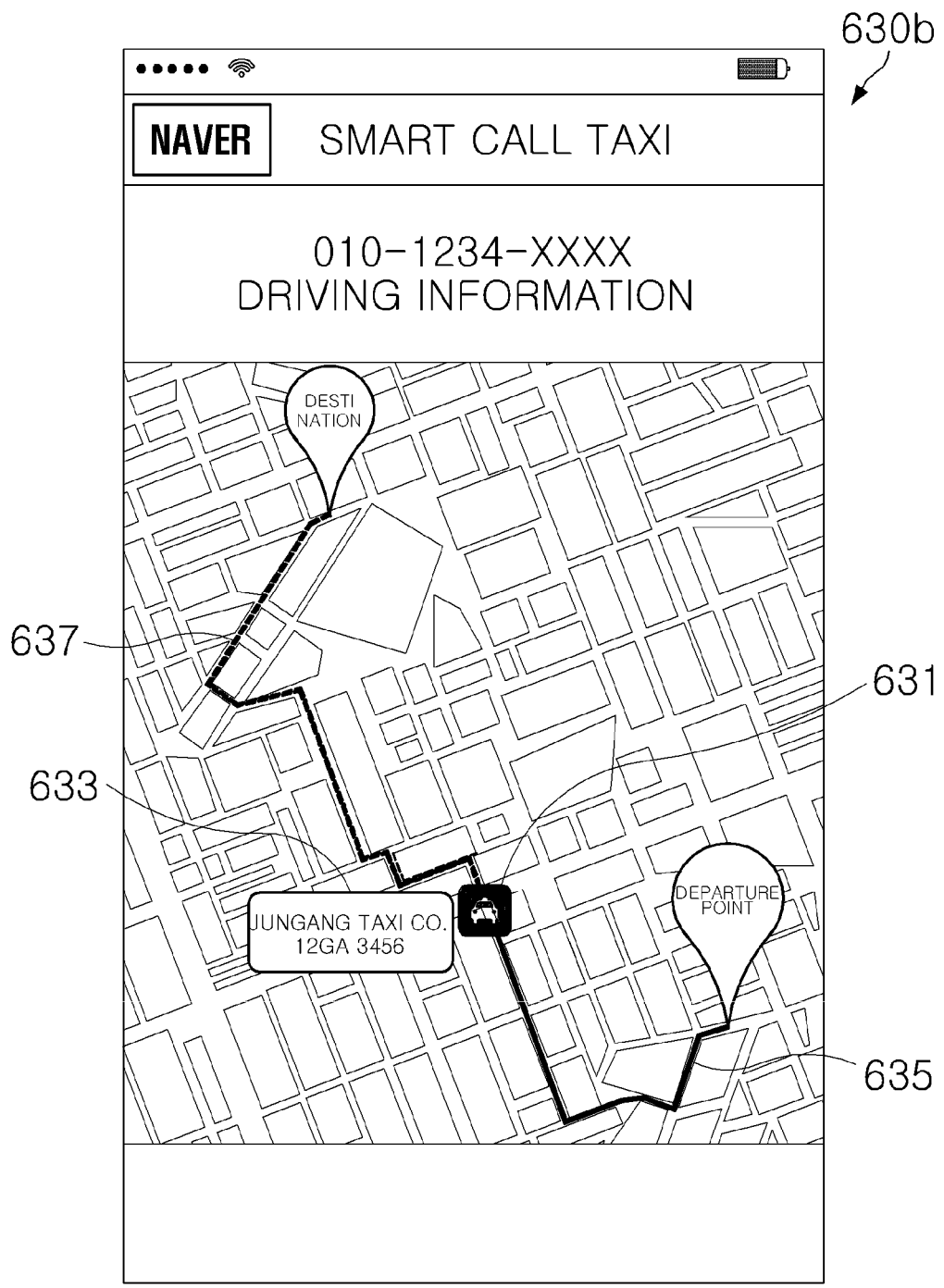

For example, as shown in FIGS. 16A and 16B, the moving route information stored in the member information manager 150 of the call taxi service server 100 is provided on map screens 630a and 630b. In FIG. 16A, a current location 631 of the call taxi the user boarded may be provided based on the location information of the mobile communication terminal 10 together with a moved route 635 of the user, and in addition, information 633 about the call taxi the user boarded may also be provided.

In addition, when the call taxi service server 100 generates the driving route information as the user selects a route according to an embodiment, not only the moved route 635 but also a future driving route 637 may be provided through the map screen 630*b* as shown in FIG. 16B.

As such, according to an embodiment of the present invention, since information about a dispatched call taxi and driving route information are provided to an acquaintance, an unsavory incident after a user boards the dispatched call taxi may be prevented, and even if an accident should occur, the accident may be quickly handled.

Specifically, since information about a driving route selected by the user is also provided, when a moving route deviates from the driving route, kidnapping or abduction may be predicted, and thus the kidnapping or abduction may be quickly handled.

Referring back to FIG. 13, when the user alights from the dispatched call taxi and inputs alighting information in operation S810 and the mobile communication terminal 10 transmits alighting confirmation information in operation S830, the call taxi request processor 110 of the call taxi service server 100 accumulates call taxi service using history of the user in operation S850 to calculate credibility of the user in operation S870, and stores the credibility as the member information of the user in the member information manager 150 of the call taxi service server 100 in operation S890. In other words, the credibility of the user may be calculated by accumulating history or results of comparing the number of times a call taxi was dispatched as the user requests for a call taxi and the number of times the user inputted alighting information. If the user cancels a dispatch or does not board a call taxi without any action, the credibility may decrease. At this time, the call taxi service server 100 may add the credibility of the user to the call request information and transmit the call request information to the call taxi control server 300 while requesting the call taxi control server 300 to dispatch a call taxi.

Figure 17:
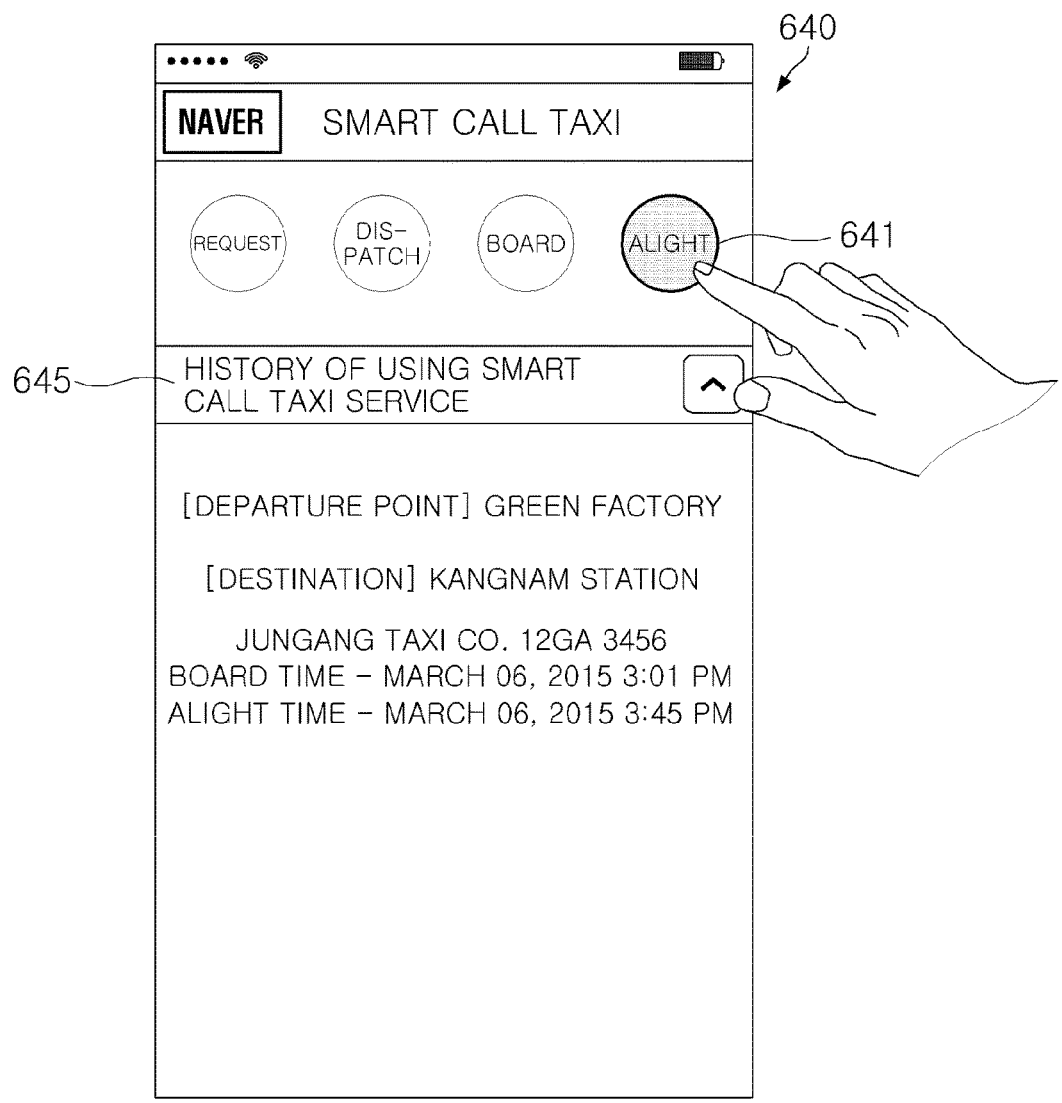
FIG. 17 illustrates a screen for a user to check alighting in a method of providing a call taxi service, according to an embodiment of the present invention.

FIG. 17 illustrates a screen for the user to check alighting according to an embodiment of the present invention.

When the user selects an alight icon 641 on an alighting confirmation screen 640 provided to the mobile communication terminal 10, alighting confirmation information is transmitted to the call taxi service server 100 and the call taxi service server 100 performs an alighting process of the user described above. Also, the call taxi service server 100 calculates the credibility of the user and manages the credibility as the member information of the user.

In addition, a history 645 of the user using the call taxi service is provided on the alighting confirmation screen 640.

As such, since credibility of a user is calculated and a taxi driver is able to check the credibility of the user who called a call taxi, the taxi driver may further actively respond to the call as the taxi driver is eased from concerns about the user not boarding on the call taxi.

According to the present invention, since a call taxi service is provided by using human and physical networks of a plurality of call taxi companies, the human and physical networks for the call taxi service become abundant, and thus a dispatch success rate of a call taxi may be increased and a dispatch time may be reduced.

Specifically, since a user is able to check the credibility of a taxi driver, the user may safely use a call taxi, and also, since the taxi driver is able to check the credibility of the user who called the call taxi, the taxi driver may further actively respond to the call since the taxi driver is eased from concerns about the user not boarding on the call taxi.

In addition, according to an embodiment of the present invention, since a call taxi service is provided in connection to an integral search service or a map search service that is easily accessed and frequently used by a user, the user may easily receive the call taxi service without separate manipulation.

Also, since various types of information for requesting a call taxi are generated through user information that is selectively input by a user, automatically recognized, or stored, inconvenient operations performed to request a call taxi may be omitted, and by providing various types of information about a dispatched call taxi, the user may easily check the dispatched call taxi.

Furthermore, according to an embodiment of the present invention, a user first receives information about dispatchable call taxis and selects a desired call taxi based on the received information, and specifically, since taxi company information or driver information is pre-provided, the user is able to safely use a call taxi. Also, since the user is able to personally set a route for the call taxi, the user may prevent a taxi driver from maliciously taking a detour route, thereby preventing unnecessary taxi fare.

Also, according to an embodiment of the present invention, since a user is able to notify an acquaintance of information about a dispatched call taxi and driving route information, an unsavory incident after boarding the dispatched call taxi may be prevented, and an accident may be quickly handled. Specifically, since information about a driving route selected by the user is also provided, when a moving route deviates from the driving route, kidnapping or abduction may be predicted, and thus the kidnapping or abduction may be quickly handled.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. A method of providing a call taxi service to a mobile communication terminal of a user, the method comprising:
    establishing communication between the mobile communication terminal of the user and a taxi call service server through a communication network, responsive to a call taxi request from the mobile communication terminal of the user;
    generating, by the taxi call service server, call request information based on the call taxi request from the mobile communication terminal of the user;
    transmitting, through the communication network, the call request information from the taxi call service server to at least one call taxi control server in communication with a plurality of predetermined call taxis, requesting to dispatch a call taxi;
    generating, by the taxi call service server, dispatch information upon receiving a dispatch response from the call taxi control server;
    providing, by the taxi call service server, the dispatch information to the mobile communication terminal through the communication network;

receiving, by the taxi call service server from the mobile communication terminal of the user, a boarding confirmation regarding a dispatched call taxi; and generating and transmitting, by the taxi call service server, boarding information including the dispatch information to a contact number pre-set correspondingly to the user or to a contact number input by the user.

2. The method of claim 1, further comprising:

providing, by the taxi call service server to the mobile communication terminal, responsive to the receiving of the call taxi request, a call taxi service screen having an input box for at least one of destination information and departure point information;

wherein the call request information includes at least one of the destination information, the departure point information, and member information of the user.

3. The method of claim 2, wherein the call taxi service screen is provided according to a call taxi search of the user through an integrated search screen provided to the mobile communication terminal or according to selection of a call taxi request icon included in a map search screen provided to the mobile communication terminal.

4. The method of claim 2, further comprising:

calculating and providing, by the taxi call server to the mobile communication terminal, at least one expected route based on the departure point information and the destination information; and generating driving route information based on an expected route selected by the user, and after the requesting to dispatch a call taxi, providing the driving route information to a terminal of the dispatched call taxi.

5. The method of claim 4, wherein the providing of the driving route information comprises transmitting the driving route information to the terminal of the dispatched call taxi through the call taxi control server.

6. The method of claim 4, wherein the dispatch response comprises connection information about the terminal of the dispatched call taxi, and the providing of the driving route information comprises transmitting the driving route information to the terminal of the dispatched call taxi through the connection information.

7. The method of claim 4, wherein the generating of the driving route information comprises:

providing a route setting screen to the mobile communication terminal; and generating the driving route information by modifying the expected route according to a route setting of the user.

8. The method of claim 1, wherein the requesting to dispatch a call taxi comprises:

providing at least one piece of call taxi company information to the mobile communication terminal of the user;

requesting a call taxi control server corresponding to call taxi company information selected by the user to dispatch a call taxi, and receiving a dispatch response from the call taxi control server corresponding to call taxi company information selected by the user; and generating the dispatch information based on the dispatch response.

9. The method of claim 1, wherein the requesting to dispatch a call taxi comprises:

requesting a plurality of call taxi control servers corresponding to a plurality of call taxi companies according to a set order of the plurality of call taxi companies to dispatch a call taxi, wherein, when a pre-set response time exceeds or a dispatch inability response is received from any of the plurality of call taxi control servers, a call taxi control server corresponding to a next call taxi company is requested to dispatch a call taxi based on the set order;

receiving a dispatch response from one of the plurality of call taxi control servers; and generating the dispatch information based on the dispatch response from one of the plurality of call taxi control servers.

10. The method of claim 1, wherein the requesting to dispatch a call taxi comprises:

simultaneously requesting a plurality of call taxi control servers corresponding a plurality of call taxi companies to dispatch a call taxi;

receiving a dispatch response from at least one of the plurality of call taxi control servers; and generating the dispatch information based on the dispatch response received from the call taxi control server that transmitted the dispatch response first.

11. The method of claim 1, wherein the requesting to dispatch a call taxi comprises:

receiving dispatchability information from the at least one call taxi control server by inquiring of the at least one call taxi control server about dispatchability based on the call taxi request, and generating at least one piece of call taxi information based on the dispatchability information;

providing the at least one piece of call taxi information to the mobile communication terminal of the user;

requesting a call taxi control server corresponding to call taxi information selected by the user to dispatch a call taxi, and receiving a dispatch response from the call taxi control server corresponding to call taxi information selected by the user; and generating the dispatch information based on the dispatch response.

12. The method of claim 11, wherein the call taxi information comprises at least one of taxi company information, taxi type information, license plate number information, driver information, and taxi location information.

13. The method of claim 12, wherein the providing of the at least one piece of call taxi information comprises providing call taxi information about at least one dispatchable call taxi to a map screen based on the taxi location information.

14. The method of claim 1, wherein the dispatch response comprises location information of the dispatched call taxi, and the providing of the dispatch information comprises providing the dispatch information to a map screen on the mobile communication terminal based on the location information of the dispatched call taxi.

15. The method of claim 1, wherein the generating and transmitting of the boarding information comprises generating and transmitting uniform resource locator (URL) information about a storage location in which the boarding information is stored.

16. The method of claim 15, further comprising:

receiving, by the taxi call service server, location information from the mobile communication terminal of the user periodically or in real-time and generating moving route information based on the location information; and storing the moving route information in the storage location corresponding to the URL information.

17. The method of claim 1, further comprising:
receiving, by the taxi call service server, an alighting confirmation from the mobile communication terminal of the user; and
accumulating call taxi service using history of the user and calculating credibility of the user based on the call taxi service using history, and storing information about the credibility correspondingly to member information of the user.

18. A call taxi service server for providing a call taxi service to a mobile communication terminal of a user through a communication network, said call taxi service server comprising:
a request processor configured to receive a call taxi request from the mobile communication terminal of the user and generate call request information based on the call taxi request; and
a control server interworking unit configured to request at least one call taxi control server, in communication with the call taxi service server through the communication network, to dispatch a call taxi based the call request information, and generate and provide, to the mobile communication terminal, dispatch information according to a dispatch response from the at least one call taxi control server,
wherein the at least one call taxi control server is in communication with a plurality of predetermined call taxis for dispatching at least one of the predetermined call taxis, and
wherein said control server interworking unit receives a boarding confirmation regarding a dispatched call taxi from the mobile communication terminal of the user and, generates and transmits boarding information including the dispatch information to a contact number pre-set correspondingly to the user or to a contact number input by the user.

19. The call taxi service server of claim 18, wherein the request processor is configured to interwork with a search service server providing an integral search service to the mobile communication terminal or with a map service server providing a map search service to the mobile communication terminal, to provide the call taxi service linked to the integral search service or the map search service.

* * * * *